US012053863B2

(12) United States Patent
Nakahara et al.

(10) Patent No.: US 12,053,863 B2
(45) Date of Patent: Aug. 6, 2024

(54) IMPACT TOOL

(71) Applicant: Panasonic Intellectual Property Management Co., Ltd., Osaka (JP)

(72) Inventors: Masayuki Nakahara, Osaka (JP); Takashi Kusagawa, Osaka (JP); Takahiro Ueda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 289 days.

(21) Appl. No.: 17/621,622

(22) PCT Filed: Apr. 30, 2020

(86) PCT No.: PCT/JP2020/018313
§ 371 (c)(1),
(2) Date: Dec. 21, 2021

(87) PCT Pub. No.: WO2020/261764
PCT Pub. Date: Dec. 30, 2020

(65) Prior Publication Data

US 2022/0324085 A1 Oct. 13, 2022

(30) Foreign Application Priority Data

Jun. 28, 2019 (JP) ................................. 2019-122443
Jun. 28, 2019 (JP) ................................. 2019-122445
(Continued)

(51) Int. Cl.
*B25B 21/02* (2006.01)
*B25B 23/147* (2006.01)
*B25F 5/00* (2006.01)

(52) U.S. Cl.
CPC .......... *B25B 21/02* (2013.01); *B25B 23/1475* (2013.01); *B25F 5/001* (2013.01)

(58) Field of Classification Search
CPC ...... B25B 21/02; B25B 23/1475; B25F 5/001
See application file for complete search history.

(56) References Cited

U.S. PATENT DOCUMENTS

2004/0100220 A1* 5/2004 Fu ........................... B60L 15/00 318/700
2009/0267546 A1 10/2009 Maekawa et al.
(Continued)

FOREIGN PATENT DOCUMENTS

CN 101567659 A 10/2009
EP 1695794 A2 8/2006
(Continued)

OTHER PUBLICATIONS

International Search Report and Written Opinion issued in International Patent Application No. PCT/JP2020/018313, dated Jul. 14, 2020; with partial English translation.
(Continued)

*Primary Examiner* — Anne Marie Antonucci
*Assistant Examiner* — Luis G Del Valle
(74) *Attorney, Agent, or Firm* — Rimon P.C.

(57) ABSTRACT

An impact tool includes an electric motor, an impact mechanism, an acquisition unit, and a behavior decision unit (retreat detection unit). The electric motor includes a permanent magnet and a coil. The impact mechanism performs an impact operation that generates impacting force by receiving motive power from the electric motor. The behavior decision unit makes, based on at least one of a torque current acquisition value (current measured value) which is a value of a torque current acquired by the acquisition unit or an excitation current acquisition value (current measured value) which is a value of an excitation current acquired by the acquisition unit, a decision about behavior of the impact mechanism.

14 Claims, 17 Drawing Sheets

(30) Foreign Application Priority Data

Jul. 5, 2019 (JP) ................................. 2019-126537
Jul. 5, 2019 (JP) ................................. 2019-126538

(56) References Cited

U.S. PATENT DOCUMENTS

| | | | | |
|---|---|---|---|---|
| 2013/0025892 | A1 * | 1/2013 | Mashiko | B25B 21/026 173/2 |
| 2013/0287602 | A1 | 10/2013 | Suzuki et al. | |
| 2015/0021062 | A1 * | 1/2015 | Sekino | B25B 23/14 173/183 |
| 2015/0270796 | A1 | 9/2015 | Watanabe | |
| 2015/0352699 | A1 | 12/2015 | Sakai et al. | |
| 2017/0031331 | A1 * | 2/2017 | Morita | G06N 5/045 |
| 2017/0057064 | A1 | 3/2017 | Ishikawa et al. | |
| 2017/0217001 | A1 | 8/2017 | Oishi et al. | |
| 2019/0022836 | A1 * | 1/2019 | Chu | G01L 25/003 |
| 2019/0047131 | A1 * | 2/2019 | Ichikawa | B25B 21/02 |
| 2020/0112283 | A1 * | 4/2020 | Mahot | B25B 21/026 |
| 2020/0119677 | A1 * | 4/2020 | Takahashi | H02P 21/32 |
| 2020/0130153 | A1 | 4/2020 | Yoneda | |

FOREIGN PATENT DOCUMENTS

| | | | |
|---|---|---|---|
| EP | 2921263 | A1 | 9/2015 |
| EP | 3 591 835 | A1 | 1/2020 |
| JP | H11-138459 | A | 5/1999 |
| JP | 2013-230060 | A | 11/2013 |
| JP | 2014-140930 | A | 8/2014 |
| JP | 2017-042839 | A | 3/2017 |
| JP | 2017-132021 | A | 8/2017 |
| WO | 2014/064836 | A1 | 5/2014 |
| WO | 2018/159274 | A1 | 9/2018 |
| WO | 2018/230141 | A1 | 12/2018 |

OTHER PUBLICATIONS

Extended European Search Report dated Jul. 13, 2022 issued in the corresponding European Patent Application No. 20832958.1.

Chinese Office Action and Search Report dated Aug. 1, 2023 issued in the corresponding Chinese Patent Application No. 202080046438.7, with English translation.

* cited by examiner

IMPACT TOOL

CROSS-REFERENCE OF RELATED APPLICATIONS

This application is the U.S. National Phase under 35 U.S.C. § 371 of International Patent Application No. PCT/JP2020/018313, filed on Apr. 30, 2020, which in turn claims the benefit of Japanese Application No. 2019-122443, filed on Jun. 28, 2019, Japanese Application No. 2019-122445, filed on Jun. 28, 2019, Japanese Application 2019-126537, filed on Jul. 5, 2019, Japanese Application No. 2019-126538, filed on Jul. 5, 2019, the entire disclosures of which Applications are incorporated by reference herein.

TECHNICAL FIELD

The present disclosure generally relates to an impact tool, and more particularly relates to an impact tool including an electric motor.

BACKGROUND ART

Patent Literature 1 discloses an impact rotary tool including an impact mechanism, an impact detecting unit, a control unit, and a voltage detecting unit. The impact mechanism includes a hammer and applies impact/shock to an output shaft with the output of a motor. The impact detecting unit detects the impact applied by the impact mechanism. The control unit stops the rotation of the motor based on a result of detection by the impact detecting unit. The voltage detecting unit detects voltage at the impact detecting unit. The control unit determines, based on the voltage detected by the voltage detecting unit while the motor is not running, whether or not the impact detecting unit is operating improperly.

CITATION LIST

Patent Literature

Patent Literature 1: JP 2017-132021 A

SUMMARY OF INVENTION

It is therefore an object of the present disclosure to provide an impact tool with the ability to make a decision about the behavior of an impact mechanism.

An impact tool according to an aspect of the present disclosure includes an electric motor, an impact mechanism, an acquisition unit, and a behavior decision unit. The electric motor includes a permanent magnet and a coil. The impact mechanism performs an impact operation that generates impacting force by receiving motive power from the electric motor. The acquisition unit acquires at least one of: a value of a torque current to be supplied to the coil; or a value of an excitation current to be supplied to the coil. The excitation current generates, in the coil, a magnetic flux causing a variation in the permanent magnet's magnetic flux. The behavior decision unit makes, based on at least one of a torque current acquisition value or an excitation current acquisition value, a decision about behavior of the impact mechanism. The torque current acquisition value is the value of the torque current acquired by the acquisition unit. The excitation current acquisition value is the value of the excitation current acquired by the acquisition unit.

DESCRIPTION OF EMBODIMENTS

Figure 1:
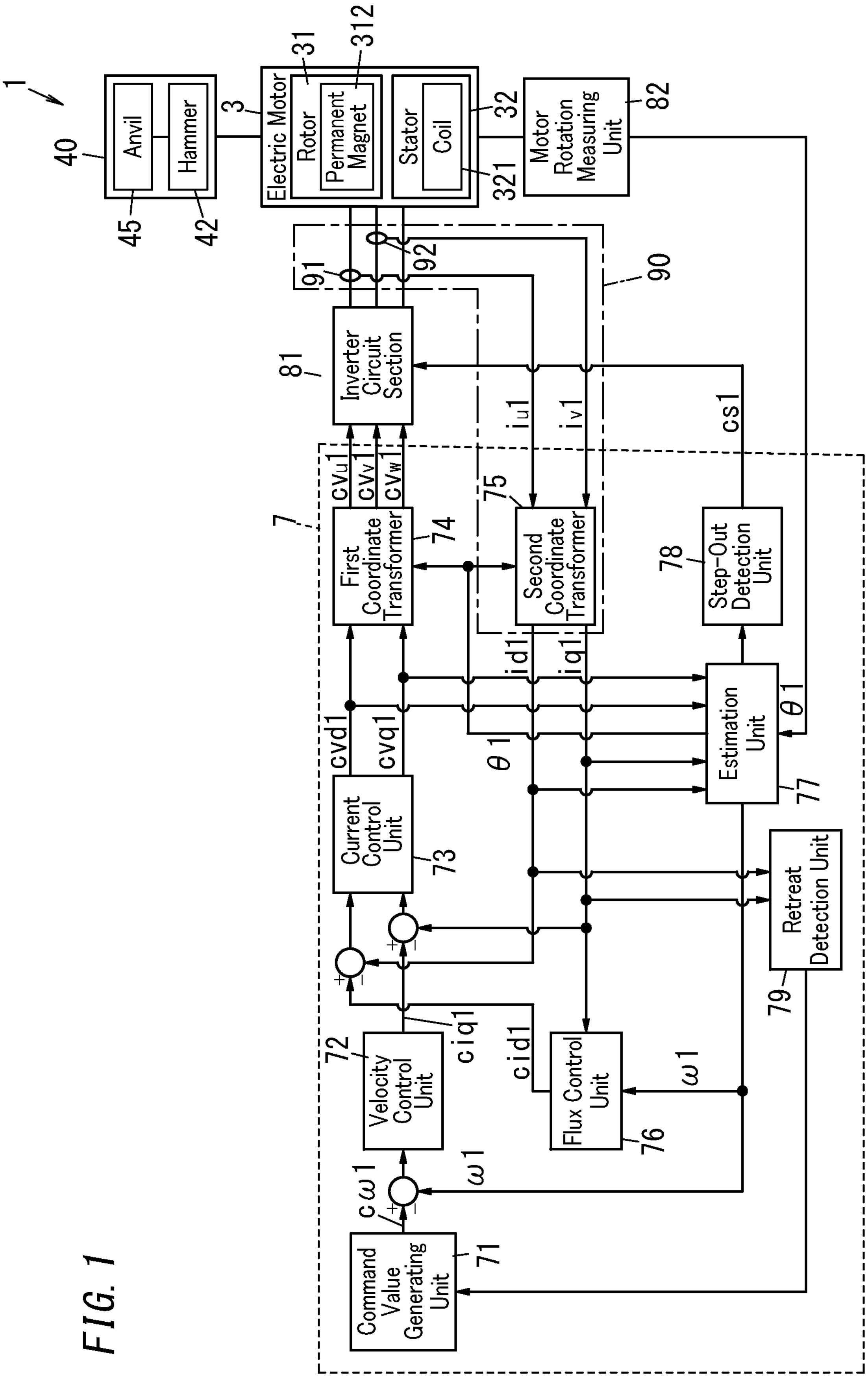
FIG. 1 is a block diagram of an impact tool according to a first embodiment.

Embodiments of an impact tool 1 will now be described in detail with reference to the accompanying drawings. Note that the embodiments to be described below are only exemplary ones of various embodiments of the present disclosure and should not be construed as limiting. Rather, the exemplary embodiments may be readily modified in various manners depending on a design choice or any other factor without departing from the scope of the present disclosure. Optionally, the embodiments and their variations to be described below may be adopted in combination as appropriate. Also, the drawings to be referred to in the following description of embodiments are schematic representations. That is to say, the ratio of the dimensions (including thicknesses) of respective constituent elements illustrated on the drawings does not always reflect their actual dimensional ratio.

(Overview)

An impact tool 1 according to an exemplary embodiment includes an electric motor 3 (AC motor), an impact mechanism 40, an acquisition unit 90, and a behavior decision unit (a retreat detection unit 79 and a recognition unit 84). The electric motor 3 includes a permanent magnet 312 and a coil 321. The impact mechanism 40 performs an impact operation that generates impacting force by receiving motive power from the electric motor 3. The acquisition unit 90 acquires at least one of: a value of a torque current to be supplied to (the coil 321 of) the electric motor 3; or a value of an excitation current to be supplied to the coil 321. The excitation current generates, in the coil 321, a magnetic flux causing a variation in the permanent magnet's 312 magnetic flux. As used herein, the phrase "generates, in the coil 321, a magnetic flux causing a variation in the permanent magnet's 312 magnetic flux" means, stated otherwise, using the magnetic flux generated by the coil 321 to cause a variation in the density of a magnetic flux around the permanent magnet 312. The behavior decision unit makes, based on at least one of a torque current acquisition value or an excitation current acquisition value, a decision about the behavior of the impact mechanism 40. The torque current acquisition value is the value of the torque current acquired by the acquisition unit 90. The excitation current acquisition value is the value of the excitation current acquired by the acquisition unit 90.

As can be seen, the impact tool 1 may make a decision about the behavior of the impact mechanism 40 by using at least one of the torque current acquisition value or the excitation current acquisition value, thus allowing taking an appropriate measure according to the behavior of the impact mechanism 40. In addition, this also improves the decision accuracy compared to making a decision about the behavior of the impact mechanism 40 based on a battery voltage and a battery current of a battery pack serving as a power supply for the impact tool 1. Furthermore, this also eliminates the need to measure a battery voltage or a battery current when making a decision about the behavior of the impact mechanism 40.

First Embodiment (1-1) Overview of First Embodiment

In a first exemplary embodiment, detecting the status of occurrence of unstable behavior in the impact mechanism 40 corresponds to making a decision about the behavior of the impact mechanism 40. The behavior decision unit includes a retreat detection unit 79 (detection unit). The retreat detection unit 79 detects, based on a torque current acquisition value that is a value of a torque current acquired by the acquisition unit 90, the status of occurrence of unstable behavior in the impact mechanism 40. This allows taking an appropriate measure against the unstable behavior of the impact mechanism 40. In addition, this also improves the decision accuracy compared to detecting the status of occurrence of unstable behavior in the impact mechanism 40 based on a battery voltage and a battery current of a battery pack serving as a power supply for the impact tool 1. Furthermore, this also eliminates the need to measure a battery voltage or a battery current when detecting the status of occurrence of unstable behavior in the impact mechanism 40.

(1-2) Configuration

Figure 2:
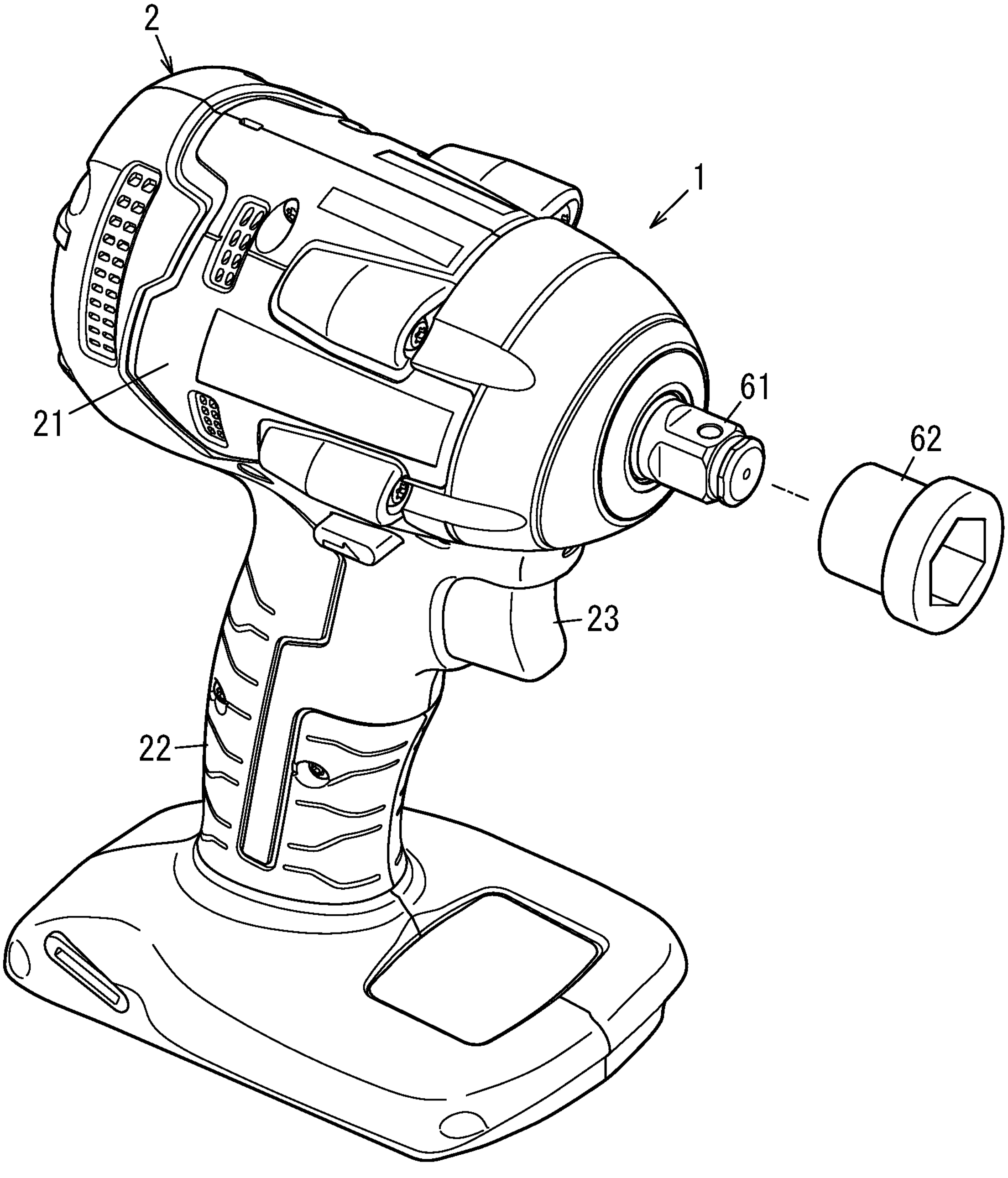
FIG. 2 is a perspective view of the impact tool.

A configuration for the impact tool 1 will be described in further detail with reference to FIGS. 2-4. In the following description, the direction in which a drive shaft 41 and an output shaft 61 (to be described later) are arranged side by side will be defined as a forward/backward direction, the output shaft 61 is regarded as being located forward of the drive shaft 41, and the drive shaft 41 is regarded as being located backward of the output shaft 61. Also, in the following description, a direction in which a barrel 21 and a grip 22 (to be described later) are arranged one on top of the other will be defined as an upward/downward direction, the barrel 21 is regarded as being located over the grip 22, and the grip 22 is regarded as being located under the barrel 21.

Figure 3:
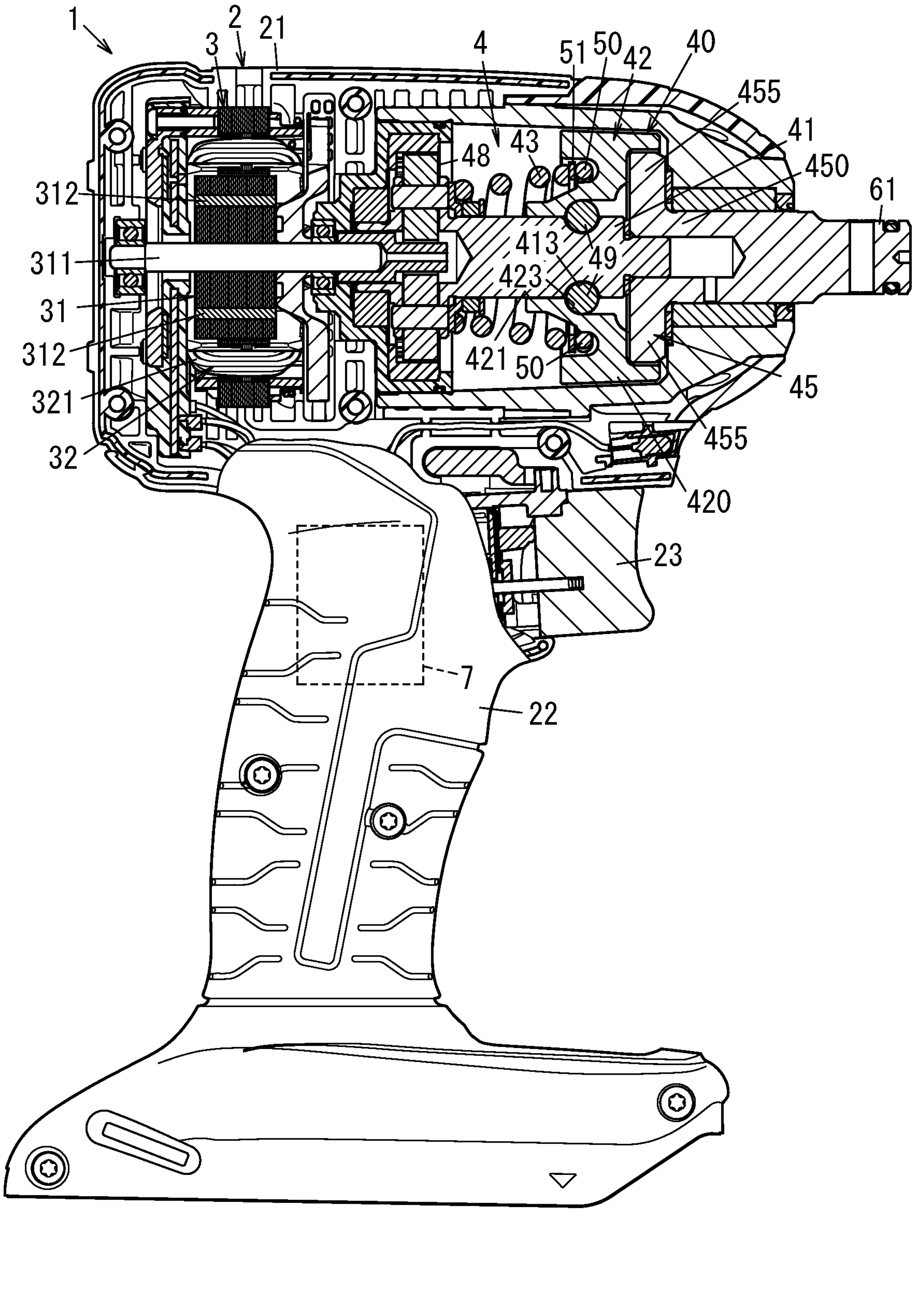
FIG. 3 is a side sectional view of the impact tool.
Figure 4:
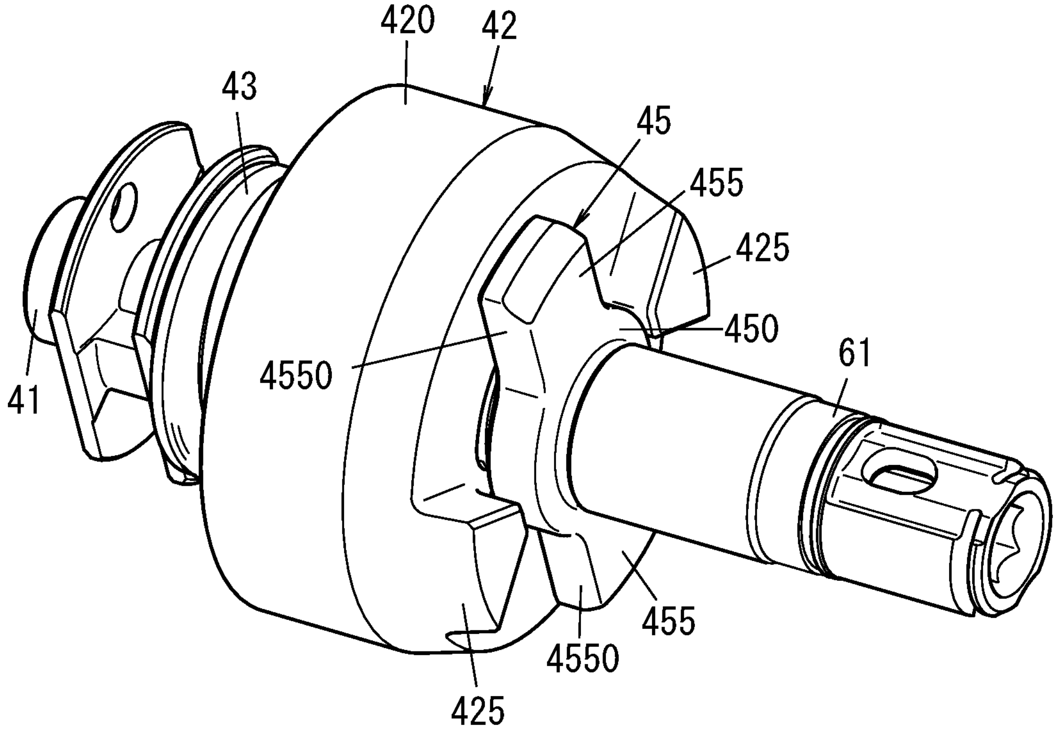
FIG. 4 is a perspective view of a main part of the impact tool.

The impact tool 1 according to this embodiment includes an electric motor 3, a transmission mechanism 4, the output shaft 61 (socket mounting portion), a housing 2, a trigger volume 23, and a control unit 7 (see FIGS. 1 and 3).

The housing 2 houses the electric motor 3, the transmission mechanism 4 and the control unit 7, and a part of the output shaft 61. The housing 2 includes the barrel 21 and the grip 22. The barrel 21 has a circular cylindrical shape. The grip 22 protrudes from the barrel 21.

The trigger volume 23 protrudes from the grip 22. The trigger volume 23 is an operating member for accepting an operating command for controlling the rotation of the electric motor 3. The ON/OFF states of the electric motor 3 may be switched by pulling the trigger volume 23. In addition, the rotational velocity of the electric motor 3 is adjustable by the manipulative variable indicating how deep the trigger volume 23 has been pulled. Specifically, the greater the manipulative variable is, the higher the rotational velocity of the electric motor 3 becomes. The control unit 7 (see FIG. 1) starts or stops turning the electric motor 3 and controls the rotational velocity of the electric motor 3 according to the manipulative variable indicating how deep the trigger volume 23 has been pulled. In the impact tool 1 according to this embodiment, a socket 62 is attached as a tip tool to the output shaft 61. The output shaft 61 rotates along with the socket 62 upon receiving the rotational power from the electric motor 3. Controlling the rotational velocity of the electric motor 3 by operating the trigger volume 23 allows the rotational velocity of the socket 62 to be controlled.

A rechargeable battery pack is attached removably to the impact tool 1. The impact tool 1 is powered by the battery pack as a power supply. That is to say, the battery pack is a power supply that supplies a current for driving the electric motor 3. The battery pack is not a constituent element of the impact tool 1. Optionally, the impact tool 1 may include the battery pack. The battery pack includes an assembled battery formed by connecting a plurality of secondary batteries (such as lithium-ion batteries) in series and a case that houses the assembled battery therein.

The electric motor 3 may be a brushless motor, for example. In particular, the electric motor 3 according to this embodiment is a synchronous motor. More specifically, the electric motor 3 may be a permanent magnet synchronous motor (PMSM). The electric motor 3 includes: a rotor 31 having a rotary shaft 311 and a permanent magnet 312; and a stator 32 having a coil 321. The rotor 31 is caused to rotate with respect to the stator 32 by electromagnetic interaction between the permanent magnet 312 and the coil 321.

The socket 62 is attached as a tip tool to the output shaft 61. The transmission mechanism 4 transmits the rotational power of the rotary shaft 311 of the electric motor 3 to the socket 62 via the output shaft 61, thus causing the socket 62 to turn. Turning the socket 62 while putting the socket 62 on a fastening member (such as a bolt, screw (e.g., a wood screw), or a nut) enables the user to perform the machining work of tightening or loosening the fastening member. The transmission mechanism 4 includes the impact mechanism 40. The impact tool 1 according to this embodiment is an electric impact screwdriver for fastening a screw while performing an impact operation using the impact mechanism 40. During the impact operation, impacting force is applied to a fastening member such as a screw via the output shaft 61.

Note that the socket 62 is attachable to, and removable from, the output shaft 61. To the output shaft 61, a socket anvil may be attached instead of the socket 62. To the output shaft 61, a bit (such as a screwdriver bit or a drill bit) may be attached as a tip tool via the socket anvil.

As can be seen, the output shaft 61 is a constituent element for holding the tip tool (which may be either the socket 62 or a bit) thereon. In this embodiment, the tip tool is not a constituent element of the impact tool 1. However, this is only an example and should not be construed as limiting. Alternatively, the tip tool may also be one of constituent elements of the impact tool 1.

The transmission mechanism 4 includes not only the impact mechanism 40 but also a planetary gear mechanism 48. The impact mechanism 40 includes the drive shaft 41, the hammer 42, a return spring 43, the anvil 45, and two steel spheres 49. The rotational power of the rotary shaft 311 of the electric motor 3 is transmitted to the drive shaft 41 via the planetary gear mechanism 48. The drive shaft 41 is arranged between the electric motor 3 and the output shaft 61.

Figure 5:
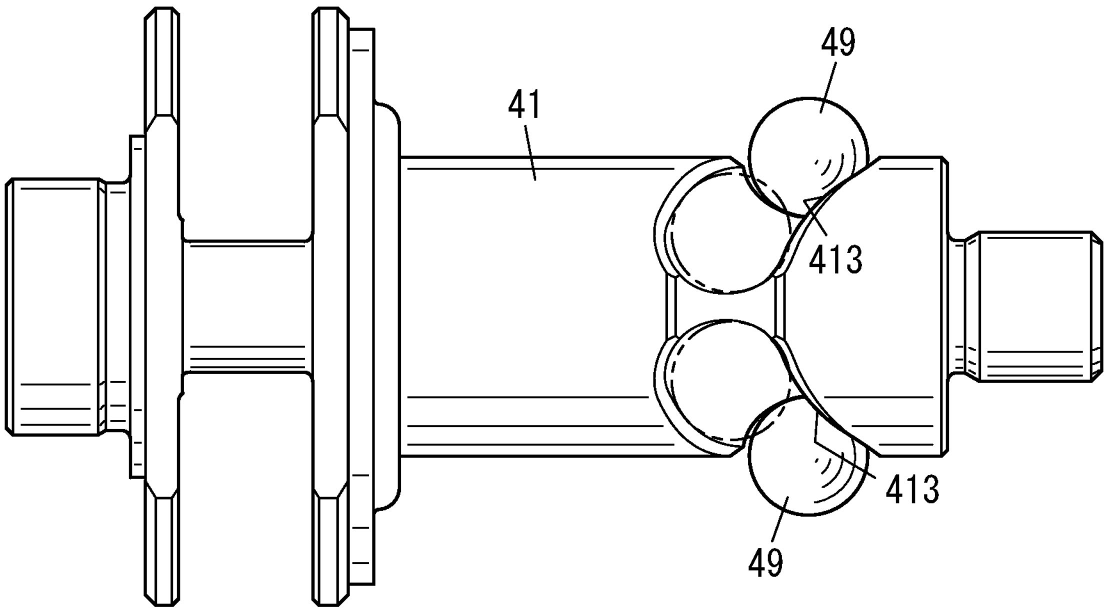
FIG. 5 is a side view of a drive shaft and two steel spheres of the impact tool.

The hammer 42 moves relative to the anvil 45 and applies rotational impact to the anvil 45 upon receiving motive power from the electric motor 3. The hammer 42 includes a hammer body 420 and two projections 425. The two projections 425 protrude from a surface, facing the output shaft 61, of the hammer body 420. The hammer body 420 has a through hole 421 to pass the drive shaft 41 therethrough. The hammer body 420 has two grooves 423 on an inner peripheral surface of the through hole 421. The drive shaft 41 has two grooves 413 (see FIG. 5) on an outer peripheral surface thereof. The two grooves 413 are connected to each other. The two steel spheres 49 are sandwiched between the two grooves 423 and two grooves 413. The two grooves 423, the two grooves 413, and the two steel spheres 49 together form a cam mechanism. The cam mechanism allows, while the two steel spheres 49 are rolling, the hammer 42 to move along the axis of the drive shaft 41 with respect to the drive shaft 41 and rotate with respect to the drive shaft 41. As the hammer 42 moves along the axis of the drive shaft 41 either toward, or away from, the output shaft 61, the hammer 42 rotates with respect to the drive shaft 41.

The anvil 45 is formed integrally with the output shaft 61. The anvil 45 holds the tip tool (which may be either the socket 62 or the bit) thereon via the output shaft 61. The anvil 45 includes an anvil body 450 and two pawls 455. The anvil body 450 has an annular shape. The two pawls 455 protrude from the anvil body 450 along the radius of the anvil body 450. The anvil 45 faces the hammer body 420 along the axis of the drive shaft 41. Also, while the impact mechanism 40 is not performing the impact operation, the hammer 42 and the anvil 45 rotate together with the two projections 425 of the hammer 42 kept in contact with the two pawls 455 of the anvil 45 in the direction in which the drive shaft 41 turns. Thus, at this time, the drive shaft 41, the hammer 42, the anvil 45, and output shaft 61 rotate along with each other.

The return spring 43 is interposed between the hammer 42 and the planetary gear mechanism 48. The return spring 43 according to this embodiment is a conical coil spring. The impact mechanism 40 further includes a plurality of (e.g., two in the example illustrated in FIG. 3) steel spheres 50 and a ring 51 which are inserted between the hammer 42 and the return spring 43. This allows the hammer 42 to rotate with respect to the return spring 43. The hammer 42 receives, from the return spring 43, biasing force applied along the axis of the drive shaft 41 toward the output shaft 61.

In the following description, the movement of the hammer 42 along the axis of the drive shaft 41 toward the output shaft 61 will be hereinafter referred to as "advancement of the hammer 42." Also, in the following description, the movement of the hammer 42 along the axis of the drive shaft 41 away from the output shaft 61 will be hereinafter referred to as "retreat of the hammer 42."

In the impact mechanism 40, when the load torque increases to a predetermined value or more, an impact operation is started. That is to say, as the load torque increases, the proportion of a force component having a direction that causes the hammer 42 to retreat increases with respect to the force generated between the hammer 42 and the anvil 45. When the load torque increases to the predetermined value or more, the hammer 42 retreats while compressing the return spring 43. In addition, as the hammer 42 retreats, the hammer 42 rotates while the two projections 425 of the hammer 42 are going over the two pawls 455 of the anvil 45. Thereafter, the hammer 42 advances upon receiving recovery force from the return spring 43. Then, when the drive shaft 41 goes approximately half around, the two projections 425 of the hammer 42 collide against the side surface 4550 of the two pawls 455 of the anvil 45. In this impact mechanism 40, every time the drive shaft 41 goes approximately half around, the two projections 425 of the hammer 42 collide against the two pawls 455 of the anvil 45. That is to say, every time the drive shaft 41 goes approximately half around, the hammer 42 applies rotational impact to the anvil 45.

As can be seen, in this impact mechanism 40, collisions between the hammer 42 and the anvil 45 occur repeatedly. The torque caused by these collisions allows the fastening member such as a bolt, a screw, or a nut to be fastened more tightly than in a situation where no collisions occur between the hammer 42 and the anvil 45.

Figure 6:
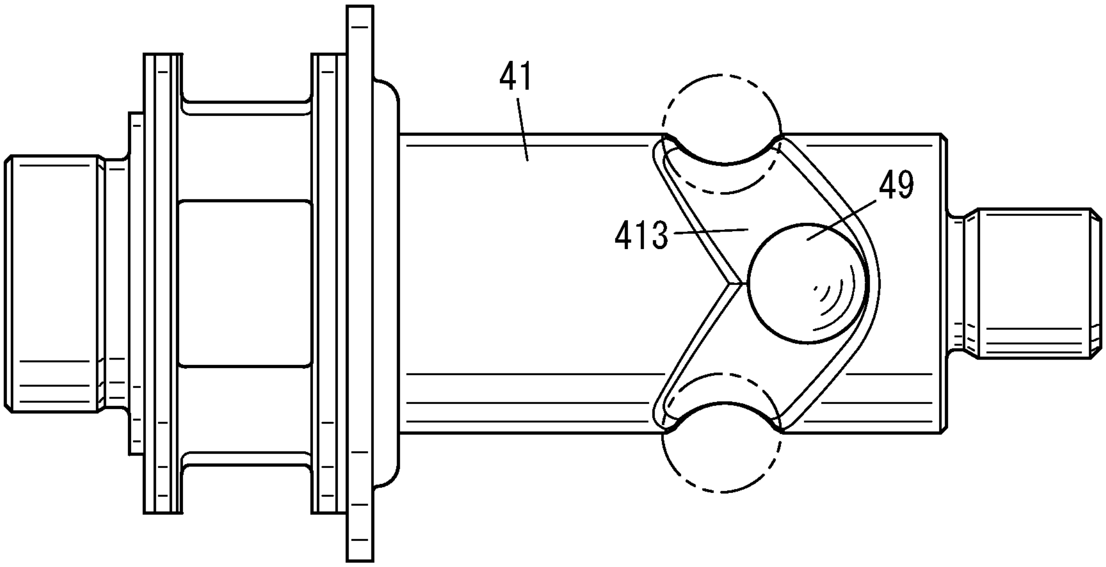
FIG. 6 is a top view of the drive shaft and the two steel spheres of the impact tool.

In this embodiment, each of the two grooves 413 (see FIG. 5) of the drive shaft 41 is formed in a V-shape when viewed in the upward/downward direction, as shown in FIG. 6. When each of the steel spheres 49 stops at a position corresponding to the middle of an associated one of the V-grooves (as indicated by the solid circles in FIGS. 5 and 6), the hammer 42 has advanced to the front end of its movable range. While the impact mechanism 40 is performing no impact operation, the steel spheres 49 stay at positions corresponding to the respective middles of the V-grooves. On the other hand, when each of the steel spheres 49 stops at a position corresponding to any one of the two ends of its associated V-groove (as indicated by the two-dot chains in FIGS. 5 and 6), the hammer 42 has retreated to the rear end of its movable range. In the following description, the retreat of the hammer 42 to the rear end of its movable range will be hereinafter referred to as a "maximum retreat." That is to say, in this description, the movement of the hammer 42 to a position most distant from the anvil 45 within its movable range will be hereinafter referred to as a "maximum retreat." The maximum retreat of the hammer 42 may occur, for example, either when the number of revolutions of the electric motor 3 is relatively large or when the magnitude of the load applied to the output shaft 61 of the impact tool 1 increases steeply while the impact mechanism 40 is performing an impact operation. In addition, the maximum retreat of the hammer 42 may also occur when the return spring 43 that causes the hammer 42 to advance has insufficient spring force. Furthermore, the maximum retreat of the hammer 42 may also occur when the number of revolutions of the electric motor 3 is not adjusted appropriately according to the type, shape, rigidity, or any other parameter of the tip tool.

When the hammer 42 makes the maximum retreat, the behavior of the hammer 42 is more unstable than when the hammer 42 retreats by a proper distance. That is to say, in such a situation, even if force is applied to the hammer 42 in such a direction that causes the hammer 42 to retreat, the hammer 42 cannot retreat any further. In addition, in such a situation, the force that causes the hammer 42 to retreat will be absorbed into the hammer 42. This could shorten the life of the hammer 42.

Thus, the retreat detection unit 79 detects the status of occurrence of the maximum retreat of the hammer 42 as the status of occurrence of unstable behavior in the impact mechanism 40. According to one implementation, when the retreat detection unit 79 detects the occurrence of such unstable behavior in the impact mechanism 40 (e.g., the maximum retreat of the hammer 42), the control unit 7 decreases the number of revolutions of the electric motor 3. Specifically, when the retreat detection unit 79 detects the occurrence of such unstable behavior in the impact mechanism 40 (e.g., the maximum retreat of the hammer 42), the control unit 7 decreases the command value cω1 (see FIG. 1) of the angular velocity of the rotation of the electric motor 3. This contributes to canceling the maximum retreat. That is to say, decreasing the number of revolutions of the electric motor 3 corresponds to a countermeasure against the unstable behavior in the impact mechanism 40.

(1-3) Control Unit

The control unit 7 includes a computer system including one or more processors and a memory. At least some of the functions of the control unit 7 are performed by making the one or more processors of the computer system execute a program stored in the memory of the computer system. The program may be stored in the memory. The program may also be downloaded via a telecommunications line such as the Internet or distributed after having been stored in a non-transitory storage medium such as a memory card.

As shown in FIG. 1, the control unit 7 includes a command value generating unit 71, a velocity control unit 72, a current control unit 73, a first coordinate transformer 74, a second coordinate transformer 75, a flux control unit 76, an estimation unit 77, a step-out detection unit 78, and a retreat detection unit 79. The impact tool 1 includes the control unit 7, an inverter circuit section 81, a motor rotation measuring unit 82, and a plurality of (e.g., two in the example illustrated in FIG. 1) current sensors 91, 92.

The control unit 7 controls the operation of the electric motor 3. More specifically, the control unit 7 is used along with the inverter circuit section 81 that supplies a current to the electric motor 3 and performs feedback control to control the operation of the electric motor 3. The control unit 7 performs vector control for controlling, independent of each other, an excitation current (d-axis current) and a torque current (q-axis current) to be supplied to the electric motor 3.

In this embodiment, the retreat detection unit 79 is included in the control unit 7. However, the retreat detection unit 79 does not have to be included in the control unit 7.

The two current sensors 91, 92 are included in the acquisition unit 90 described above. The acquisition unit 90 includes the two current sensors 91, 92 and the second coordinate transformer 75. The acquisition unit 90 acquires an excitation current (a current measured value id1 of the d-axis current) and a torque current (a current measured value iq1 of the q-axis current) to be supplied to the electric motor 3. The acquisition unit 90 acquires the current measured values id1, iq1 by calculating the current measured values id1, iq1 by itself. That is to say, the current measured values id1, iq1 are obtained by having two-phase currents measured by the two current sensors 91, 92 transformed by the second coordinate transformer 75.

Each of the plurality of current sensors 91, 92 includes, for example, a hall element current sensor or a shunt resistor element. The plurality of current sensors 91, 92 measure an electric current supplied from the battery pack to the electric motor 3 via the inverter circuit section 81. In this embodiment, three-phase currents (namely, a U-phase current, a V-phase current, and a W-phase current) are supplied to the electric motor 3. The plurality of current sensors 91, 92 measure currents in at least two phases. In FIG. 1, the current sensor 91 measures the U-phase current to output a current measured value $i_u$1 and the current sensor 92 measures the V-phase current to output a current measured value $i_v$1.

The motor rotation measuring unit 82 measures the rotational angle of the electric motor 3. As the motor rotation measuring unit 82, a photoelectric encoder or a magnetic encoder may be adopted, for example.

The estimation unit 77 performs time differentiation on the rotational angle θ1, measured by the motor rotation measuring unit 82, of the electric motor 3 to calculate an angular velocity ω1 of the electric motor 3 (i.e., the angular velocity of the rotary shaft 311).

The second coordinate transformer 75 performs, based on the rotational angle θ1, measured by the motor rotation measuring unit 82, of the electric motor 3, coordinate transformation on the current measured values $i_u$1, $i_v$1 measured by the plurality of current sensors 91, 92, thereby calculating current measured values id1, iq1. That is to say, the second coordinate transformer 75 transforms the current measured values $i_u$1, $i_v$1, corresponding to currents in three phases, into a current measured value id1 corresponding to a magnetic field component (d-axis current) and a current measured value iq1 corresponding to a torque component (q-axis current).

The command value generating unit 71 generates a command value cω1 for the angular velocity of the electric motor 3. The command value generating unit 71 may generate, for example, a command value cω1 representing a manipulative variable that indicates how deep the trigger volume 23 (see FIG. 2) has been pulled. That is to say, as the manipulative variable increases, the command value generating unit 71 increases the command value cω1 of the angular velocity accordingly.

The velocity control unit 72 generates a command value ciq1 based on the difference between the command value cω1 generated by the command value generating unit 71 and the angular velocity ω1 calculated by the estimation unit 77. The command value ciq1 is a command value specifying the magnitude of a torque current (q-axis current) of the electric motor 3. That is to say, the control unit 7 controls the operation of the electric motor 3 to bring the torque current (q-axis current) to be supplied to the coil 321 of the electric motor 3 closer toward the command value ciq1 (target value). The velocity control unit 72 determines the command value ciq1 to reduce the difference between the command value cω1 and the angular velocity ω1.

The flux control unit 76 generates a command value cid1 based on the angular velocity ω1 calculated by the estimation unit 77 and the current measured value iq1 (q-axis current). The command value cid1 is a command value that specifies the magnitude of the excitation current (d-axis current) of the electric motor 3. That is to say, the control unit 7 controls the operation of the electric motor 3 to bring the excitation current (d-axis current) to be supplied to the coil 321 of the electric motor 3 closer toward the command value cid1 (target value).

The command value cid1 generated by the flux control unit 76 may be, for example, a command value to set the magnitude of the excitation current at zero. The flux control unit 76 may generate the command value cid1 to set the magnitude of the excitation current at zero constantly or may generate a command value cid1 to set the magnitude of the excitation current at a value greater or smaller than zero only as needed. When the command value cid1 of the excitation current becomes smaller than zero, a negative excitation current (i.e., a flux-weakening current) flows through the electric motor 3, thus weakening the magnetic flux of the permanent magnet 312 with a weakened flux.

The current control unit 73 generates a command value cvd1 based on the difference between the command value cid1 generated by the flux control unit 76 and the current measured value id1 calculated by the second coordinate transformer 75. The command value cvd1 is a command value that specifies the magnitude of an excitation voltage (d-axis voltage) of the electric motor 3. The current control unit 73 determines the command value cvd1 to reduce the difference between the command value cid1 and the current measured value id1.

In addition, the current control unit 73 also generates a command value cvq1 based on the difference between the command value ciq1 generated by the velocity control unit 72 and the current measured value iq1 calculated by the second coordinate transformer 75. The command value cvq1 is a command value that specifies the magnitude of a torque voltage (q-axis voltage) of the electric motor 3. The current control unit 73 generates the command value cvq1 to reduce the difference between the command value ciq1 and the current measured value iq1.

The first coordinate transformer 74 performs coordinate transformation on the command values cvd1, cvq1 based on the rotational angle θ1, measured by the motor rotation measuring unit 82, of the electric motor 3 to calculate command values $cv_u$1, $cv_v$1, $cv_w$1. Specifically, the first coordinate transformer 74 transforms the command value cvd1 for a magnetic field component (d-axis voltage) and the command value cvq1 for a torque component (q-axis voltage) into command values $cv_u$1, $cv_v$1, $cv_w$1 corresponding to voltages in three phases. Specifically, the command value $cv_u$1 corresponds to a U-phase voltage, the command value $cv_v$1 corresponds to a V-phase voltage, and the command value $cv_w$1 corresponds to a W-phase voltage.

The inverter circuit section 81 supplies voltages in three phases, corresponding to the command values $cv_u$1, $cv_v$1, $c_w$1, respectively, to the electric motor 3. The control unit 7 controls the power to be supplied to the electric motor 3 by performing pulse width modulation (PWM) control on the inverter circuit section 81.

The electric motor 3 is driven with the power (voltages in three phases) supplied from the inverter circuit section 81, thus generating rotational driving force.

As a result, the control unit 7 controls the excitation current such that the excitation current (d-axis current) flowing through the coil 321 of the electric motor 3 comes to have a magnitude corresponding to the command value cid1 generated by the flux control unit 76. In addition, the control unit 7 also controls the angular velocity of the electric motor 3 such that the angular velocity of the electric motor 3 becomes an angular velocity corresponding to the command value cω1 generated by the command value generating unit 71.

The step-out detection unit 78 detects a step-out (loss of synchronism) of the electric motor 3 based on the current measured values id1, iq1 acquired from the second coordinate transformer 75 and the command values cvd1, cvq1 acquired from the current control unit 73. On detecting the step-out, the step-out detection unit 78 transmits a stop signal cs1 to the inverter circuit section 81, thus having the supply of power from the inverter circuit section 81 to the electric motor 3 stopped.

(1-4) Exemplary Operation

Next, an exemplary operation of the impact tool 1 will be described with reference to FIG. 7.

Figure 7:
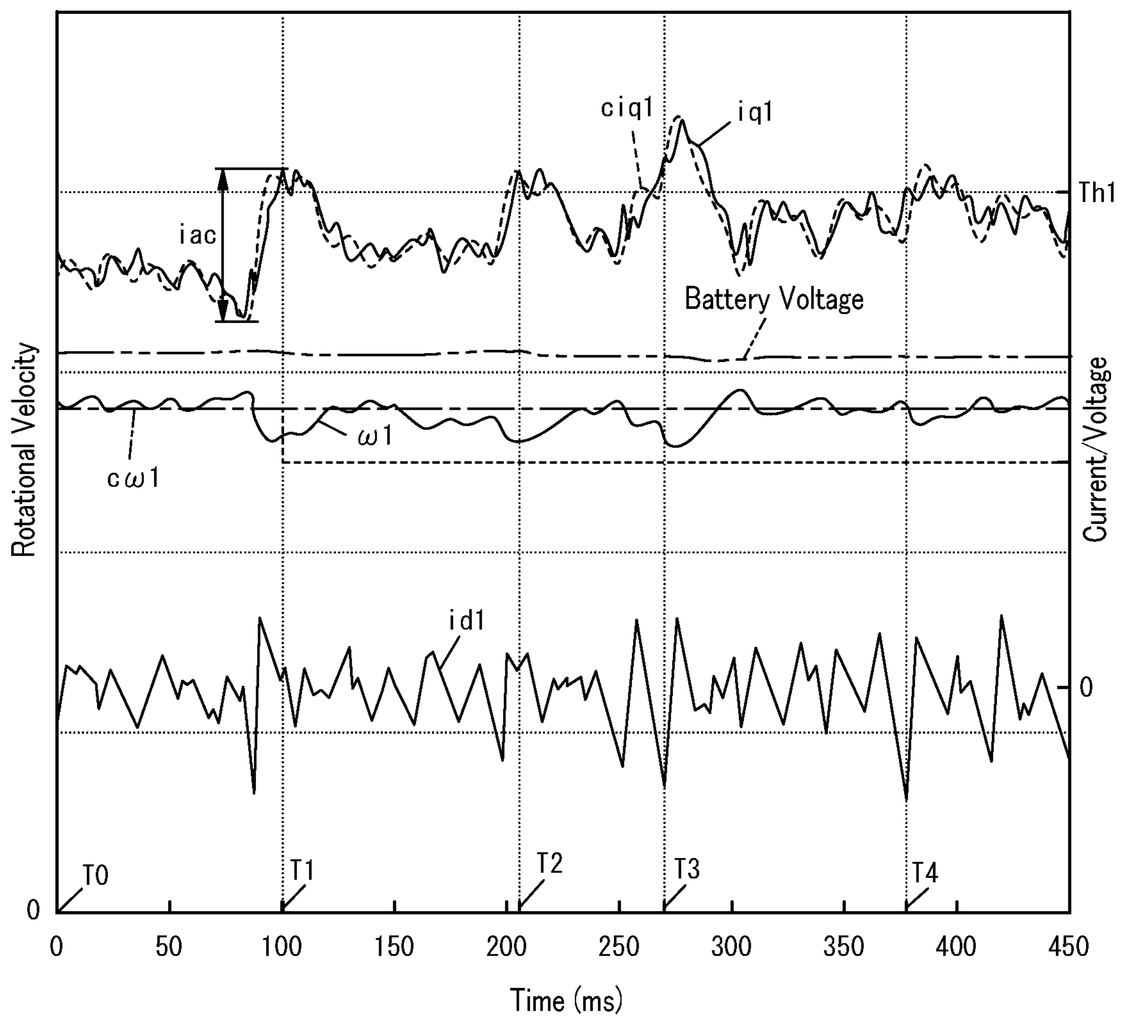
FIG. 7 is a graph showing an exemplary operation of the impact tool.

In FIG. 7, the "battery voltage" refers to a battery voltage of the battery pack serving as a power supply for the electric motor 3. Although not shown in FIG. 7, the command value cid1 of the excitation current is always zero in the exemplary operation shown in FIG. 7.

As described above, according to one implementation, when the retreat detection unit 79 detects the occurrence of unstable behavior (such as the maximum retreat) in the impact mechanism 40, the control unit 7 decreases the number of revolutions of the electric motor 3. In FIG. 7, the dotted line indicates how the command value cω1 of the angular velocity ω1 changes with time according to such an implementation. Specifically, when the retreat detection unit 79 detects the occurrence of unstable behavior in the impact mechanism 40 (at a point in time T1), the control unit 7 decreases the command value cω1.

Nevertheless, the control unit 7 does not have to perform such a control. In the exemplary operation shown in FIG. 7, the control unit 7 may also always keep the command value cω1 of the angular velocity ω1 of the electric motor 3 constant (as indicated by the one-dot-chain representing the command value cω1). In other words, in the exemplary operation shown in FIG. 7, the control unit 7 always keeps the command value of the number of revolutions of the electric motor 3 constant. Thus, in the exemplary operation shown in FIG. 7, even when the retreat detection unit 79 detects the occurrence of unstable behavior (maximum retreat) in the impact mechanism 40, the control unit 7 does not perform the control of decreasing the number of revolutions of the electric motor 3.

As can be seen, the control unit 7 controls, at least unless a result of detection obtained by the retreat detection unit 79 indicates the occurrence of unstable behavior in the impact mechanism 40, the operation of the electric motor 3 to bring the number of revolutions (angular velocity ω1) of the electric motor 3 closer toward a certain target value (command value ω1). Even in a situation where the control unit 7 performs the control of decreasing the number of revolutions of the electric motor 3 when the retreat detection unit 79 detects the occurrence of unstable behavior in the impact mechanism 40, the command value cω1 is suitably kept constant as long as the retreat detection unit 79 detects the occurrence of no unstable behavior in the impact mechanism 40. Adopting the retreat detection unit 79 in the impact tool 1 that performs such control allows the retreat detection unit 79 to easily detect the status of occurrence of unstable behavior in the impact mechanism 40 due to a variation in the number of revolutions of the electric motor 3.

The acquisition unit 90 acquires, as a torque current acquisition value, the actually measured value (current measured value iq1) of a torque current (q-axis current) to be supplied to the coil 321. The retreat detection unit 79 detects, based on the torque current acquisition value acquired by the acquisition unit 90, the status of occurrence of unstable behavior (maximum retreat) in the impact mechanism 40. More specifically, the retreat detection unit 79 detects, based on the absolute value of an instantaneous value of the torque current acquisition value (current measured value iq1) acquired by the acquisition unit 90, the status of occurrence of unstable behavior (maximum retreat) in the impact mechanism 40. Even more specifically, the retreat detection unit 79 detects, when finding the absolute value of the current measured value iq1 of the torque current greater than a threshold value Th1, the occurrence of unstable behavior (maximum retreat) in the impact mechanism 40. That is to say, the retreat detection unit 79 detects a variation in the current measured value iq1 when the maximum retreat of the hammer 42 occurs. The threshold value Th1 may be stored, for example, in the memory of a computer system serving as the control unit 7.

Unless the maximum retreat occurs, the hammer 42 may rotate while retreating with respect to the drive shaft 41. When the maximum retreat occurs, however, the rotation of the hammer 42 that is retreating with respect to the drive shaft 41 is restricted. Thus, when the maximum retreat occurs, the torque of the electric motor 3 increases and the absolute value of the current measured value iq1 of the torque current increases as well. Thus, the retreat detection unit 79 detects such an increase in the absolute value of the current measured value iq1.

In FIG. 7, the impact tool 1 is supposed to be used as an impact screwdriver to fasten a screw (or a bolt). The person who performs the machining work (hereinafter referred to as a "worker") inserts a screw into the socket 62 at a point in time before the point in time T0. Thereafter, the worker performs the operation of pulling the trigger volume 23 of the impact tool 1 at another point in time before the point in time T0. This causes a q-axis current (torque current) to start flowing through the electric motor 3, thus causing the electric motor 3 to start turning. After that, the rotational velocity (angular velocity ω1) of the electric motor 3 increases gradually according to the manipulative variable indicating how deep the trigger volume 23 has been pulled. From the point in time T0 on, the impact mechanism 40 of the impact tool 1 performs an impact operation.

At the point in time T1, the current measured value iq1 of the torque current exceeds the threshold value Th1. Thus, the retreat detection unit 79 detects that the maximum retreat has occurred. In addition, at each of the points in time T2, T3, T4, the current measured value iq1 of the torque current also exceeds the threshold value Th1. Thus, at each of the points in time T2, T3, T4, the retreat detection unit 79 also detects that the maximum retreat has occurred.

As can be seen from the foregoing description, in the impact tool 1 according to this embodiment, the retreat detection unit 79 may detect the status of occurrence of unstable behavior (maximum retreat) in the impact mechanism 40 by using the torque current acquisition value (current measured value iq1). This enables taking a countermeasure against unstable behavior of the impact mechanism 40. For example, the countermeasure of decreasing the number of revolutions of the electric motor 3 when the unstable behavior occurs may be taken as a countermeasure against the unstable behavior of the impact mechanism 40.

In addition, this also improves the detection accuracy compared to detecting the status of occurrence of unstable behavior in the impact mechanism 40 based on a battery voltage and a battery current of a battery pack serving as a power supply for the impact tool 1. That is to say, when unstable behavior occurs in the impact mechanism 40, the torque current acquisition value tends to vary more significantly than the battery voltage and the battery current. Thus, using the torque current acquisition value instead of the battery voltage and the battery current contributes to improving the accuracy of detecting the status of occurrence of unstable behavior in the impact mechanism 40.

Furthermore, this also eliminates the need to measure the battery voltage and the battery current when detecting the status of occurrence of unstable behavior in the impact mechanism 40. In particular, the impact tool 1 according to this embodiment adopts vector control of controlling, based on the current measured values id1, iq1 of a d-axis current and a q-axis current, the current to be supplied to the electric motor 3. According to the vector control, the electric motor 3 may be controlled even without measuring the battery voltage or the battery current. Thus, the impact tool 1 according to this embodiment achieves the advantage of enabling controlling the electric motor 3 and detecting the status of occurrence of unstable behavior in the impact mechanism 40 even without being provided with any circuit for measuring the battery voltage and battery current. This contributes to reducing the area and dimensions of a circuit provided for the impact tool 1 and cutting down the cost of providing such a circuit. Alternatively, the impact tool 1 may include a circuit for measuring the battery voltage and battery current. Also, the retreat detection unit 79 may detect, based on not only the torque current acquisition value (current measured value iq1) but also at least one of the battery voltage or battery current, the status of occurrence of unstable behavior in the impact mechanism 40.

Also, one of a plurality of tip tools of multiple different types having mutually different shapes, rigidities, or any other parameters may be attached to the output shaft 61. The retreat detection unit 79 may detect the status of occurrence of unstable behavior in the impact mechanism 40 due to a difference in type, shape, rigidity, or any other parameter between the tip tools. Furthermore, the control unit 7 controls the operation of the electric motor 3 based on a result of detection obtained by the retreat detection unit 79. This enables controlling the electric motor 3 such that the impact mechanism 40 may still operate with good stability even when the type, shape, rigidity, or any other parameter of the tip tool is changed.

(First Variation of First Embodiment)

Next, an impact tool 1 according to a first variation of the first embodiment will be described with reference to FIG. 7. In the following description, any constituent element of this first variation, having the same function as a counterpart of the first embodiment described above, will be designated by the same reference numeral as that counterpart's, and description thereof will be omitted herein.

In the impact tool 1 according to this first variation, the retreat detection unit 79 determines, under a different condition from that of the first embodiment, whether or not there is any unstable behavior (maximum retreat) in the impact mechanism 40. Specifically, in this first variation, the retreat detection unit 79 detects, based on the magnitude of an AC component of the torque current acquisition value (current measured value iq1) acquired by the acquisition unit 90, the status of occurrence of unstable behavior (maximum retreat) in the impact mechanism 40.

The retreat detection unit 79 may calculate the magnitude of the AC component of the current measured value iq1 in, for example, the following manner. Specifically, the retreat detection unit 79 calculates the difference between the maximum and minimum values of instantaneous values of the current measured value iq1 in a period from a certain point in time (e.g., at present) to a point in time earlier by a predetermined time than the certain point in time and regards the difference as the magnitude of an AC component of the current measured value iq1. That is to say, the retreat detection unit 79 regards a value corresponding to a double of the amplitude of the current measured value iq1 as the magnitude of the AC component of the current measured value iq1. FIG. 7 shows the magnitude iac of the AC component of the current measured value iq1 when the certain point in time is supposed to be the point in time T1.

Then, the retreat detection unit 79 detects, when finding the magnitude of the AC component of the current measured value iq1 exceeding a predetermined threshold value, that unstable behavior (maximum retreat) has occurred in the impact mechanism 40.

The magnitude of the AC component of the current measured value iq1 has a value that does not depend on the magnitude of a DC component of the torque current. Thus, according to this first variation, even if the magnitude of the DC component of the torque current to be supplied to the electric motor 3 varies according to the magnitude of the load applied to the impact tool 1, the status of occurrence of unstable behavior in the impact mechanism 40 may also be detected easily.

Optionally, in this first variation, the retreat detection unit 79 may calculate the difference between an instantaneous value of the current measured value iq1 at a certain point in time (e.g., at present) and an instantaneous value of the current measured value iq1 at another point in time earlier by a predetermined time than the certain point in time and may regard the difference as the magnitude of the AC component of the current measured value iq1. The predetermined time may be, for example, a half as long as one cycle of collision between the hammer 42 and the anvil 45 in the impact mechanism 40.

Alternatively, the retreat detection unit 79 may filter out harmonics of the current measured value iq1 through a low-pass filter, calculate the difference between the maximum value at a peak of the waveform representing the current measured value iq1 and the minimum value at a valley adjacent to the peak, and regard the difference as the magnitude of the AC component of the current measured value iq1.

Still alternatively, the retreat detection unit 79 may obtain an effective value of the current measured value iq1 and may regard the effective value thus obtained as the magnitude of the AC component of the current measured value iq1.

Yet alternatively, the retreat detection unit 79 may also detect, based on both the magnitude of the AC component of the current measured value iq1 and the absolute value of the instantaneous value of the current measured value iq1, the status of occurrence of unstable behavior (maximum retreat) in the impact mechanism 40. For example, the retreat detection unit 79 may detect, when finding the magnitude of the AC component of the current measured value iq1 exceeding a predetermined threshold value and the absolute value of the current measured value iq1 of the torque current exceeding the threshold value Th1, that unstable behavior (maximum retreat) has occurred in the impact mechanism 40.

(Other Variations of First Embodiment)

Next, other variations of the first embodiment will be enumerated one after another. Optionally, the variations to be described below may be adopted in combination as appropriate. Alternatively, any of the following variations may be adopted as appropriate in combination with the variation described above.

The detection unit (retreat detection unit 79) has only to detect the status of occurrence of unstable behavior in the impact mechanism 40 and is not necessarily configured to detect the status of occurrence of the maximum retreat of the hammer 42. Alternatively, the detection unit may also detect, as the status of occurrence of unstable behavior in the impact mechanism 40, the status of occurrence of instability in the velocity of the hammer 42 owing to instability (such as deviation from the target value) in the number of revolutions of the electric motor 3, for example. Still alternatively, the detection unit may also detect the status of occurrence of unstable behavior about the position of the hammer 42. The unstable behavior about the position of the hammer 42 refers to, for example, the advancement or retreat of the hammer 42 beyond a predetermined position. Yet alternatively, the detection unit may also detect, as the status of occurrence of unstable behavior, the signs of occurrence of unstable behavior in the impact mechanism 40. For example, as the hammer 42 retreats to the vicinity of the position that the hammer 42 reaches at the time of the maximum retreat, the absolute value of the instantaneous value of the current measured value iq1 increases. Thus, the status of occurrence of unstable behavior (maximum retreat) in the impact mechanism 40 may be detected based on such an increase in the absolute value of the instantaneous value of the current measured value iq1.

The acquisition unit 90 is not necessarily configured to acquire the current measured value iq1 as the torque current acquisition value. Alternatively, the acquisition unit 90 may also be configured to acquire the torque current command value ciq1 as the torque current acquisition value. In that case, the acquisition unit 90 includes at least the velocity control unit 72.

Furthermore, the acquisition unit 90 is not necessarily configured to acquire the current measured value iq1 by calculating the current measured value iq1 by itself. Alternatively, the acquisition unit 90 may also acquire the current measured value iq1 from any constituent element other than the acquisition unit 90 itself.

Optionally, the retreat detection unit 79 may detect, on sensing that the event that the absolute value of the current measured value iq1 of the torque current exceeds the threshold value Th1 has occurred a predetermined number of times (that is twice or more), that unstable behavior (maximum retreat) has occurred in the impact mechanism 40. In this case, a dead period with a predetermined length may be provided to begin from a point in time when the absolute value of the current measured value iq1 exceeds the threshold value Th1 and the retreat detection unit 79 may determine whether or not the absolute value of the current measured value iq1 exceeds the threshold value Th1 in any period other than the dead period. Alternatively, the harmonics of the current measured value iq1 may be filtered out through a low-pass filter and the retreat detection unit 79 may determine, with respect to each peak of the waveform of the current measured value iq1, whether or not the peak value is greater than the threshold value Th1. Still alternatively, the retreat detection unit 79 may also detect, when finding the frequency of occurrence that the absolute value of the current measured value iq1 of the torque current exceeds the threshold value Th1 equal to or greater than a predetermined frequency of occurrence, that unstable behavior (maximum retreat) has occurred in the impact mechanism 40.

Yet alternatively, the retreat detection unit 79 may also detect, when finding the event that the absolute value of the current measured value iq1 of the torque current changes from a value equal to or less than the threshold value Th1 into a value greater than the threshold value Th1 has occurred a predetermined number of times (that is twice or more), that unstable behavior (maximum retreat) has occurred in the impact mechanism 40.

According to an implementation of the first embodiment, when the retreat detection unit 79 detects that unstable behavior (maximum retreat) has occurred in the impact mechanism 40, the control unit 7 decreases the number of revolutions of the electric motor 3. In this case, a maximum allowable decrease may be set for the control unit 7. Optionally, every time the retreat detection unit 79 detects the occurrence of unstable behavior in the impact mechanism 40, the control unit 7 may decrease the number of revolutions of the electric motor 3 to a degree less than the maximum allowable decrease. In addition, the control unit 7 may also be configured to, when the decrease in the number of revolutions of the electric motor 3 reaches the maximum allowable decrease, stop decreasing the number of revolutions of the electric motor 3 any further. Alternatively, the control unit 7 may also be configured to decrease the number of revolutions of the electric motor 3 at regular intervals until the decrease in the number of revolutions of the electric motor 3 reaches the maximum allowable decrease. Still alternatively, as soon as the retreat detection unit 79 detects that unstable behavior has occurred in the impact mechanism 40, the control unit 7 may decrease the number of revolutions of the electric motor 3 to a degree corresponding to the maximum allowable decrease.

Optionally, the threshold value Th1 may be changed according to at least one parameter selected from the group consisting of the type, weight, and dimensions of the tip tool and the type of the load that is a workpiece. Examples of the types of the load include bolts, screws, and nuts.

The impact tool 1 does not have to be an impact screwdriver. Alternatively, the impact tool 1 may also be an impact wrench, an impact drill, or an impact drill screwdriver, for example.

In the impact tool 1 according to this embodiment, the tip tool is replaceable depending on the intended use. However, the tip tool does not have to be replaceable. Alternatively, the impact tool 1 may also be an electric tool designed to allow the use of only a particular type of tip tool.

The anvil 45 may hold the tip tool either directly or indirectly via, for example, the output shaft 61 coupled to the anvil 45.

Optionally, the output shaft 61 may be formed integrally with the tip tool.

The impact tool 1 may include a cushioning member for softening the shock applied to the hammer 42 at the time of the maximum retreat of the hammer 42. The cushioning member may be made of, for example, rubber as its material. Bringing the hammer 42 into contact with the cushioning member at the time of the maximum retreat of the hammer 42 softens the shock applied to the hammer 42.

The impact tool 1 may include a notification unit that notifies the user of a result of detection obtained by the retreat detection unit 79. The notification unit includes, for example, a buzzer or a light source, and notifies, when the retreat detection unit 79 detects the maximum retreat, the user of the maximum retreat by emitting either a sound or light.

The impact tool 1 may include a torque measuring unit. The torque measuring unit measures an operating torque of the electric motor 3. The torque measuring unit is a magnetostrictive strain sensor which may detect, for example, torsional strain. The magnetostrictive strain sensor makes a coil, installed in a non-rotating portion of the electric motor 3, detect a variation in permeability due to a strain caused by the application of a torque to the output shaft 61 of the electric motor 3 and outputs a voltage signal proportional to the strain.

The impact tool 1 may include a bit rotation measuring unit. The bit rotation measuring unit measures the rotational angle of the output shaft 61. In this case, the rotational angle of the output shaft 61 is equal to the rotational angle of the tip tool (socket 62). As the bit rotation measuring unit, a photoelectric encoder or a magnetic encoder may be adopted, for example.

Second Embodiment

Next, an impact tool 1 according to a second embodiment will be described with reference to FIG. 8. In the following description, any constituent element of this second embodiment, having the same function as a counterpart of the first embodiment described above, will be designated by the same reference numeral as that counterpart's, and description thereof will be omitted herein.

(2-1) Overview of Second Embodiment

An impact tool 1 according to the second embodiment detects the status of occurrence of unstable behavior in the impact mechanism 40 by a different method from that of the first embodiment. In the other respects, the impact tool 1 according to the second embodiment has the same configuration, and operates in the same way, as its counterpart of the first embodiment. As a block diagram of the impact tool 1 according to the second embodiment, see FIG. 1.

A behavior decision unit according to this embodiment includes the retreat detection unit 79 (detection unit). The retreat detection unit 79 detects, based on an excitation current acquisition value which is a value of an excitation current acquired by the acquisition unit 90, the status of occurrence of unstable behavior in the impact mechanism 40. This enables taking a countermeasure against the unstable behavior of the impact mechanism 40.

(2-2) Exemplary Operation

Next, an exemplary operation of the impact tool 1 will be described with reference to FIG. 8.

Figure 8:
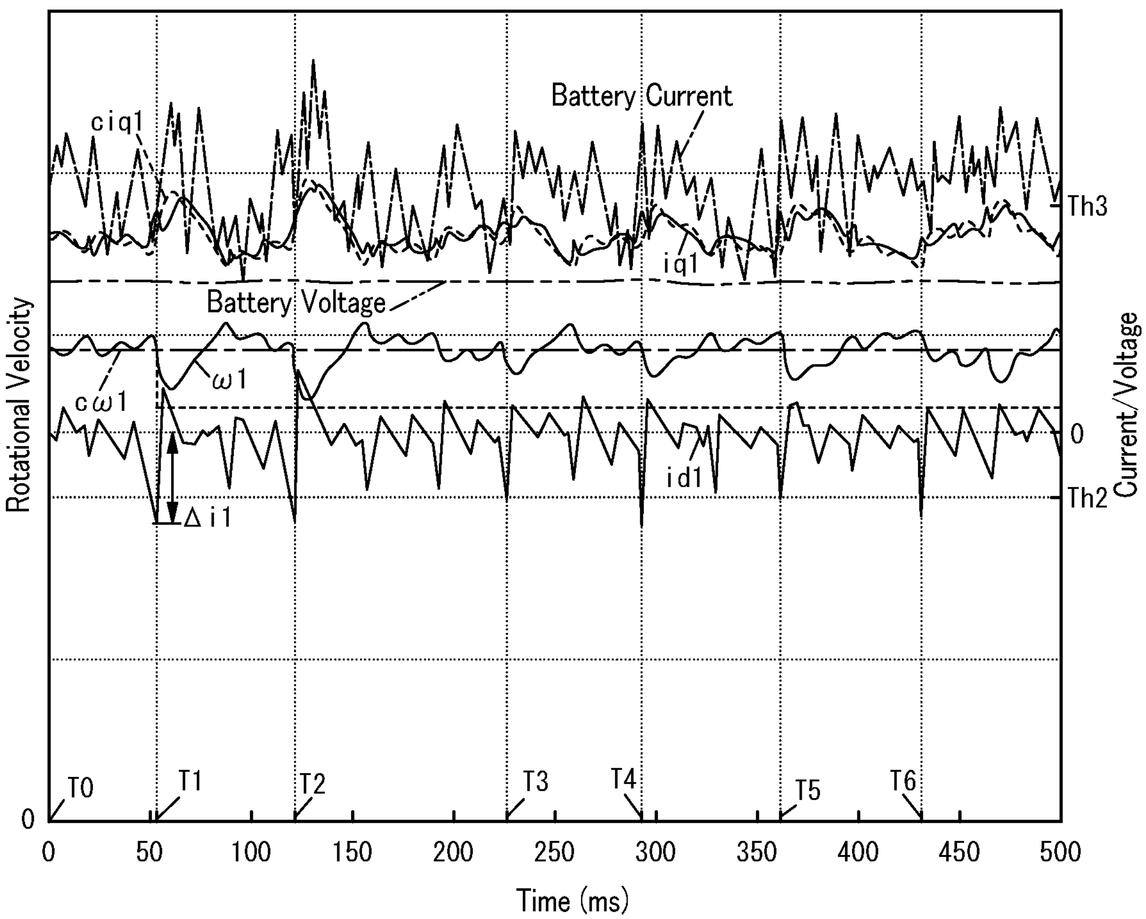
FIG. 8 is a graph showing an exemplary operation of an impact tool according to a second embodiment.

In FIG. 8, the "battery voltage" refers to a battery voltage of the battery pack serving as a power supply for the electric motor 3. In FIG. 8, the "battery current" refers to a battery current of the battery pack. Although not shown in FIG. 8, the command value cid1 of the excitation current is always zero in the exemplary operation shown in FIG. 8.

As in the first embodiment described above, according to an implementation, when the retreat detection unit 79 detects the occurrence of any unstable behavior (such as the maximum retreat) in the impact mechanism 40, the control unit 7 also decreases the number of revolutions of the electric motor 3. In FIG. 8, the dotted line indicates how the command value cω1 of the angular velocity ω1 changes with time in such an implementation. Specifically, when the retreat detection unit 79 detects the occurrence of unstable behavior in the impact mechanism 40 (at a point in time T1), the control unit 7 decreases the command value cω1.

Nevertheless, the control unit 7 does not have to perform such a control. In the exemplary operation shown in FIG. 8, the control unit 7 may also always keep the command value cω1 of the angular velocity ω1 of the electric motor 3 constant (as indicated by the one-dot-chain representing the command value cω1). In other words, in the exemplary operation shown in FIG. 8, the control unit 7 always keeps the command value of the number of revolutions of the electric motor 3 constant. Thus, in the exemplary operation shown in FIG. 8, even when the retreat detection unit 79 detects the occurrence of any unstable behavior (maximum retreat) in the impact mechanism 40, the control unit 7 does not perform the control of decreasing the number of revolutions of the electric motor 3.

As can be seen, the control unit 7 controls, at least unless a result of detection obtained by the retreat detection unit 79 indicates the occurrence of unstable behavior in the impact mechanism 40, the operation of the electric motor 3 to bring the number of revolutions (angular velocity ω1) of the electric motor 3 closer toward a certain target value (command value cω1). Even in a situation where the control unit 7 performs the control of decreasing the number of revolutions of the electric motor 3 when the retreat detection unit 79 detects the occurrence of unstable behavior in the impact mechanism 40, the command value cω1 is suitably kept constant as long as the retreat detection unit 79 detects the occurrence of no unstable behavior in the impact mechanism 40. Adopting the retreat detection unit 79 in the impact tool 1 that performs such control allows the retreat detection unit 79 to easily detect the status of occurrence of unstable behavior in the impact mechanism 40 due to a variation in the number of revolutions of the electric motor 3.

The acquisition unit 90 acquires, as an excitation current acquisition value, the actually measured value (current measured value id1) of an excitation current (d-axis current) to be supplied to the coil 321. The retreat detection unit 79 detects, based on the magnitude of the negative excitation current acquisition value (current measured value id1) acquired by the acquisition unit 90, the status of occurrence of unstable behavior (maximum retreat) in the impact mechanism 40. In this case, as for the excitation current, a current flowing in such a direction in which a magnetic flux that weakens the magnetic flux of the permanent magnet 312 (i.e., a weakened flux) is generated in the coil 321 is supposed to be the negative current. In other words, the direction in which the negative excitation current flows is supposed to be the direction of a flux-weakening current. The sign of the excitation current acquisition value (current measured value id1) agrees with the sign of the excitation current.

More specifically, the retreat detection unit 79 detects, when finding the negative excitation current acquisition value (current measured value id1) acquired by the acquisition unit 90 less than a threshold value Th2, the occurrence of unstable behavior (maximum retreat) in the impact mechanism 40. That is to say, the retreat detection unit 79 detects a variation in the current measured value id1 when the maximum retreat of the hammer 42 occurs. The threshold value Th2 is a negative value. The threshold value Th2 may be stored, for example, in the memory of a computer system functioning as the control unit 7.

Unless the maximum retreat occurs, the hammer 42 may rotate while retreating with respect to the drive shaft 41. When the maximum retreat occurs, however, the rotation of the hammer 42 that is retreating with respect to the drive shaft 41 is restricted. Thus, before and after the occurrence of the maximum retreat, the number of revolutions of the electric motor 3 varies. If the number of revolutions of the electric motor 3 varied steeply, then the measurement of the rotational angle θ1 of the electric motor 3 by the motor rotation measuring unit 82 would be unable to keep up with the variation in the number of revolutions, thus making the measured value of the rotational angle θ1 different from its actual value. More specifically, unless the maximum retreat occurs, the measured value of the rotational angle θ1 obtained by the motor rotation measuring unit 82 is a real-time value. Once the maximum retreat has occurred, however, the measured value of the rotational angle θ1 obtained by the motor rotation measuring unit 82 becomes a value obtained at a point in time slightly before the present. As a result, the current measured value id1 calculated by the second coordinate transformer 75 based on the rotational angle θ1 measured by the motor rotation measuring unit 82 becomes a value different from the actual value. Specifically, when the maximum retreat occurs, the current measured value id1 becomes a value smaller than the actual value. The retreat detection unit 79 detects such a decrease in the current measured value id1.

In FIG. 8, the impact tool 1 is supposed to be used as an impact screwdriver to fasten a screw (or a bolt). The worker inserts a screw into the socket 62 at a point in time before the point in time T0. Thereafter, the worker performs the operation of pulling the trigger volume 23 of the impact tool 1 at another point in time before the point in time T0. This causes a q-axis current (torque current) to start flowing through the electric motor 3, thus causing the electric motor 3 to start running. After that, the rotational velocity (angular velocity ω1) of the electric motor 3 increases gradually according to the manipulative variable indicating how deep the trigger volume 23 has been pulled. From the point in time T0 on, the impact mechanism 40 of the impact tool 1 performs an impact operation.

At the point in time T1, the current measured value id1 of the excitation current becomes less than the threshold value Th2. Thus, the retreat detection unit 79 detects that the maximum retreat has occurred. In addition, at each of the points in time T2, T3, T4, T5, and T6, the current measured value id1 of the excitation current is also less than the threshold value Th2. Thus, at each of the points in time T2, T3, T4, T5, and T6, the retreat detection unit 79 also detects that the maximum retreat has occurred.

As can be seen from the foregoing description, in the impact tool 1 according to this embodiment, the retreat detection unit 79 may detect the status of occurrence of unstable behavior (maximum retreat) in the impact mechanism 40 by using the excitation current acquisition value (current measured value id1). This enables taking a countermeasure against unstable behavior of the impact mechanism 40. For example, the countermeasure of decreasing the number of revolutions of the electric motor 3 when the unstable behavior occurs may be taken as a countermeasure against the unstable behavior of the impact mechanism 40.

In addition, this also improves the detection accuracy compared to detecting the status of occurrence of unstable behavior in the impact mechanism 40 based on a battery voltage and a battery current of a battery pack serving as a power supply for the impact tool 1. That is to say, when unstable behavior occurs in the impact mechanism 40, the excitation current acquisition value tends to vary more significantly than the battery voltage or the battery current. Thus, using the excitation current acquisition value instead of the battery voltage and the battery current contributes to improving the accuracy of detecting the status of occurrence of unstable behavior in the impact mechanism 40.

Furthermore, this also eliminates the need to measure the battery voltage and the battery current when detecting the status of occurrence of unstable behavior in the impact mechanism 40. In particular, the impact tool 1 according to this embodiment adopts vector control of controlling, based on the current measured values id1, iq1 of a d-axis current and a q-axis current, the current to be supplied to the electric motor 3. According to the vector control, the electric motor 3 may be controlled even without measuring the battery voltage or the battery current. Thus, the impact tool 1 according to this embodiment achieves the advantage of enabling controlling the electric motor 3 and detecting the status of occurrence of unstable behavior in the impact mechanism 40 even without being provided with any circuit for measuring the battery voltage and battery current. This contributes to reducing the area and dimensions of a circuit provided for the impact tool 1 and cutting down the cost of providing such a circuit. Alternatively, the impact tool 1 may include a circuit for measuring the battery voltage and battery current. Also, the retreat detection unit 79 may detect, based on not only the excitation current acquisition value (current measured value id1) but also at least one of the battery voltage or battery current, the status of occurrence of unstable behavior in the impact mechanism 40.

Also, one of a plurality of tip tools of multiple different types having mutually different shapes, rigidities, or any other parameters may be attached to the output shaft 61. The retreat detection unit 79 may detect the status of occurrence of unstable behavior in the impact mechanism 40 due to a difference in type, shape, rigidity, or any other parameter between the tip tools. Furthermore, the control unit 7 controls the operation of the electric motor 3 based on a result of detection obtained by the retreat detection unit 79. This enables controlling the electric motor 3 such that the impact mechanism 40 may still operate with good stability even when the type, shape, rigidity, or any other parameter of the tip tool is changed.

(First Variation of Second Embodiment)

Next, an impact tool 1 according to a first variation of the second embodiment will be described with reference to FIG. 8. In the following description, any constituent element of this first variation, having the same function as a counterpart of the second embodiment described above, will be designated by the same reference numeral as that counterpart's, and description thereof will be omitted herein.

As in the second embodiment described above, the control unit 7 also controls the operation of the electric motor 3 to bring the actually measured value (current measured value id1) of the excitation current closer toward the command value cid1 (target value). In addition, the retreat detection unit 79 according to this first variation detects, based on the difference between the command value cid1 (target value) of the excitation current and the actually measured value (current measured value id1) of the excitation current, the status of occurrence of unstable behavior (maximum retreat) in the impact mechanism 40.

In FIG. 8, the command value cid1 of the excitation current is always equal to zero. Thus, the difference between the command value cid1 of the excitation current and the current measured value id1 is equal to the current measured value id1. In FIG. 8, the difference Ail between the command value cid1 of the excitation current and the current measured value id1 at the point in time T1 is shown.

The command value cid1 of the excitation current does not have to be zero but may also be a value greater than zero, a value less than zero, or a value changing with time.

The retreat detection unit 79 detects, when finding the absolute value of the difference between the command value cid1 of the excitation current and the current measured value id1 exceeding a predetermined threshold value, that unstable behavior (maximum retreat) has occurred in the impact mechanism 40. In this case, the magnitude of the predetermined threshold value may be equal to, for example, the absolute value of the threshold value Th2 according to the second embodiment. In FIG. 8, at each of the points in time T1, T2, T3, T4, T5, and T6, the retreat detection unit 79 detects that the maximum retreat has occurred.

In this first variation, the command value cid1 of the excitation current is used to detect the status of occurrence of unstable behavior in the impact mechanism 40. Thus, even if the command value cid1 of the excitation current is a value greater than zero or a value less than zero, the status of occurrence of unstable behavior in the impact mechanism 40 is also detected with the magnitude of the command value cid1 taken into account. This may reduce the chances of causing a decline in the accuracy of detecting the status of occurrence of unstable behavior in the impact mechanism 40.

(Second Variation of Second Embodiment)

Next, an impact tool 1 according to a second variation of the second embodiment will be described with reference to FIG. 8. In the following description, any constituent element of this second variation, having the same function as a counterpart of the second embodiment described above, will be designated by the same reference numeral as that counterpart's, and description thereof will be omitted herein.

As in the second embodiment, the acquisition unit 90 also acquires the current measured value id1 of an excitation current to be supplied to the coil 321 and the current measured value iq1 of the torque current to be supplied to the coil 321. The retreat detection unit 79 detects, based on the excitation current acquisition value (current measured value id1) acquired by the acquisition unit 90 and the torque current acquisition value (current measured value iq1) acquired by the acquisition unit 90, the status of occurrence of unstable behavior (maximum retreat) in the impact mechanism 40.

Specifically, the retreat detection unit 79 detects, when finding both of the following first and second conditions satisfied within a predetermined time, that the maximum retreat has occurred in the hammer 42. The first condition is that the current measured value id1 of the excitation current should be less than a threshold value Th2. The second condition is that the absolute value of the current measured value iq1 of the torque current should be greater than a threshold value Th3. These threshold values Th2, Th3 may be stored, for example, in the memory of a computer system functioning as the control unit 7.

The predetermined time may be 10 ms, for example. That is to say, if the time it takes, since one of the first and second conditions has been satisfied, for the other of the first and second conditions to be satisfied is within 10 ms, the retreat detection unit 79 detects that the maximum retreat has occurred in the hammer 42.

In FIG. 8, the retreat detection unit 79 detects, at the points in time T1, T2, that the maximum retreat has occurred in the hammer 42.

This second variation contributes to improving the detection accuracy compared to a situation where the retreat detection unit 79 detects, based on only the excitation current acquisition value (current measured value id1), the status of occurrence of unstable behavior in the impact mechanism 40 (hammer 42). This may reduce the chances of, for example, the retreat detection unit 79 detecting, by mistake, the occurrence of unstable behavior in the impact mechanism 40 in a situation where no unstable behavior has actually occurred in the impact mechanism 40.

In another example, the predetermined period may agree with the sample period of the current measured value id1 or iq1. If the current measured values id1, iq1 are sampled in synch with each other at the same sample timing, the retreat detection unit 79 may detect, when finding the first and second conditions both satisfied at a certain sample timing of the current measured values id1, iq1, that the maximum retreat has occurred.

Alternatively, the retreat detection unit 79 may also detect, when finding at least one of the first and second conditions satisfied, that the maximum retreat has occurred.

Note that the acquisition unit 90 is not necessarily configured to acquire the current measured value iq1 as a torque current acquisition value. Alternatively, the acquisition unit 90 may also be configured to acquire the command value ciq1 of the torque current as a torque current acquisition value. In that case, the acquisition unit 90 includes at least the velocity control unit 72.

Also, the acquisition unit 90 is not necessarily configured to acquire the current measured value id1 as an excitation current acquisition value. Alternatively, the acquisition unit 90 may also be configured to acquire the command value cid1 of the excitation current as an excitation current acquisition value. In that case, the acquisition unit 90 includes at least the flux control unit 76. Optionally, in the second embodiment and the first variation of the second embodiment, the acquisition unit 90 may also be configured to acquire the command value cid1 of the excitation current as the excitation current acquisition value.

Furthermore, the acquisition unit 90 is not necessarily configured to acquire the current measured values id1, iq1 by calculating the current measured values id1, iq1 by itself. Alternatively, the acquisition unit 90 may acquire the current measured values id1, iq1 from any constituent element other than the acquisition unit 90 itself. Optionally, in the second embodiment and the first variation of the second embodiment, the acquisition unit 90 may acquire the current measured values id1, iq1 from any constituent element other than the acquisition unit 90 itself.

(Other Variations of Second Embodiment)

Next, other variations of the second embodiment will be enumerated one after another. Optionally, the variations to be described below may be adopted in combination as appropriate. Alternatively, any of the following variations may be adopted as appropriate in combination with any of the variations described above.

The detection unit (retreat detection unit 79) has only to detect the status of occurrence of unstable behavior in the impact mechanism 40 and is not necessarily configured to detect the status of occurrence of the maximum retreat in the hammer 42. Alternatively, the detection unit may also detect, as the status of occurrence of unstable behavior in the impact mechanism 40, the status of occurrence of instability in the velocity of the hammer 42 owing to instability (such as deviation from the target value) in the number of revolutions of the electric motor 3, for example. Still alternatively, the detection unit may also detect the status of occurrence of unstable behavior about the position of the hammer 42. The unstable behavior about the position of the hammer 42 refers to, for example, the advancement or retreat of the hammer 42 beyond a predetermined position. Yet alternatively, the detection unit may also detect, as the status of occurrence of unstable behavior, the signs of occurrence of unstable behavior in the impact mechanism 40.

The retreat detection unit 79 according to the second embodiment detects, based on the magnitude of the negative excitation current acquisition value (current measured value id1) acquired by the acquisition unit 90, that the maximum retreat has occurred in the hammer 42. This is because the current measured value id1 decreases when the maximum retreat occurs. Nevertheless, depending on the type and status of occurrence of the unstable behavior, the current measured value id1 may sometimes increase. That is to say, the current measured value id1 may increase before or after the occurrence of unstable behavior (which is not necessarily a maximum retreat) in the impact mechanism 40. Thus, the retreat detection unit 79 may detect, based on the magnitude of the excitation current acquisition value, the status of occurrence of unstable behavior in the impact mechanism 40, irrespective of whether the sign of the excitation current acquisition value (current measured value id1) is positive or negative.

Optionally, the retreat detection unit 79 may detect, on sensing that the event that the current measured value id1 of the excitation current is less than the threshold value Th2 has occurred a predetermined number of times (that is twice or more), that unstable behavior (maximum retreat) has occurred in the impact mechanism 40. In this case, a dead period with a predetermined length may be provided to begin from a point in time when the current measured value id1 becomes less than the threshold value Th2 and the retreat detection unit 79 may determine whether or not the current measured value id1 becomes less than the threshold value Th2 in any period other than the dead period. Alternatively, the harmonics of the current measured value id1 may be filtered out through a low-pass filter and the retreat detection unit 79 may determine, with respect to each valley of the waveform of the current measured value id1, whether or not the bottom value is less than the threshold value Th2. Still alternatively, the retreat detection unit 79 may also detect, when finding the frequency of occurrence that the current measured value id1 of the excitation current becomes less than the threshold value Th2 equal to or greater than a predetermined frequency of occurrence, that unstable behavior (maximum retreat) has occurred in the impact mechanism 40.

Yet alternatively, the retreat detection unit 79 may also detect, when finding the event that the current measured value iq1 of the excitation current changes from a value equal to or greater than the threshold value Th2 into a value less than the threshold value Th2 has occurred a predetermined number of times (that is twice or more), that unstable behavior (maximum retreat) has occurred in the impact mechanism 40.

Third Embodiment

Next, an impact tool 1 according to a third embodiment will be described with reference to FIGS. 9-12D. In the following description, any constituent element of this third embodiment, having the same function as a counterpart of the first embodiment described above, will be designated by the same reference numeral as that counterpart's, and description thereof will be omitted herein.

(3-1) Overview of Third Embodiment

In the third embodiment, recognizing the type of the behavior of the impact mechanism 40 that is performing an impact operation corresponds to making a decision about the behavior of the impact mechanism 40. The behavior decision unit includes a recognition unit 84 (see FIG. 9). The recognition unit 84 recognizes, based on a torque current acquisition value that is a value of a torque current acquired by the acquisition unit 90, the type of the behavior of the impact mechanism 40 that is performing the impact operation.

As used herein, "to recognize the type of the behavior of the impact mechanism 40" means distinguishing the type of the actual behavior of the impact mechanism 40 from the other types. For example, determining the type of the behavior to be a "proper impact" that is proper behavior means distinguishing the type of the behavior of the impact mechanism 40 from the behavior other than the "proper impact." That is to say, determining the type of the behavior to be a "proper impact" corresponds to recognizing the type of the behavior.

As can be seen, this impact tool 1 may recognize, by using the torque current acquisition value, the type of the behavior of the impact mechanism 40 that is performing an impact operation.

The impact mechanism 40 according to this embodiment includes the hammer 42 and the anvil 45. Specifically, the impacting force generated by the impact mechanism 40 is impact force generated by a collision of the hammer 42 against the anvil 45. The types of the behavior of the impact mechanism 40 that is performing the impact operation are classifiable according to, for example, the position of contact (collision) between the hammer 42 and the anvil 45 and the magnitude of movement that the hammer 42 makes when the hammer 42 goes out of contact with the anvil 45 since the hammer 42 has collided against the anvil 45.

The impact tool 1 operates basically in the same way as in the first embodiment. As already described for the first embodiment, in the impact tool 1, a "maximum retreat" that causes the hammer 42 to retreat to the rear end of its movable range may occur. In addition, contrary to the case of the maximum retreat, the hammer 42 may retreat by an insufficient distance. In that case, the behavior of the hammer 42 may become more unstable than in a situation where the hammer 42 retreats by a proper distance. The recognition unit 84 detects, as one type of behavior of the impact mechanism 40 that is performing the impact operation, such a situation where the hammer 42 retreats by an insufficient distance.

Such an implementation in which the recognition unit 84 detects (recognizes) the type of the behavior of the impact mechanism 40 that is performing an impact operation will be described in further detail later in the "(3-3) Exemplary operation" section.

(3-2) Control Unit

Figure 9:
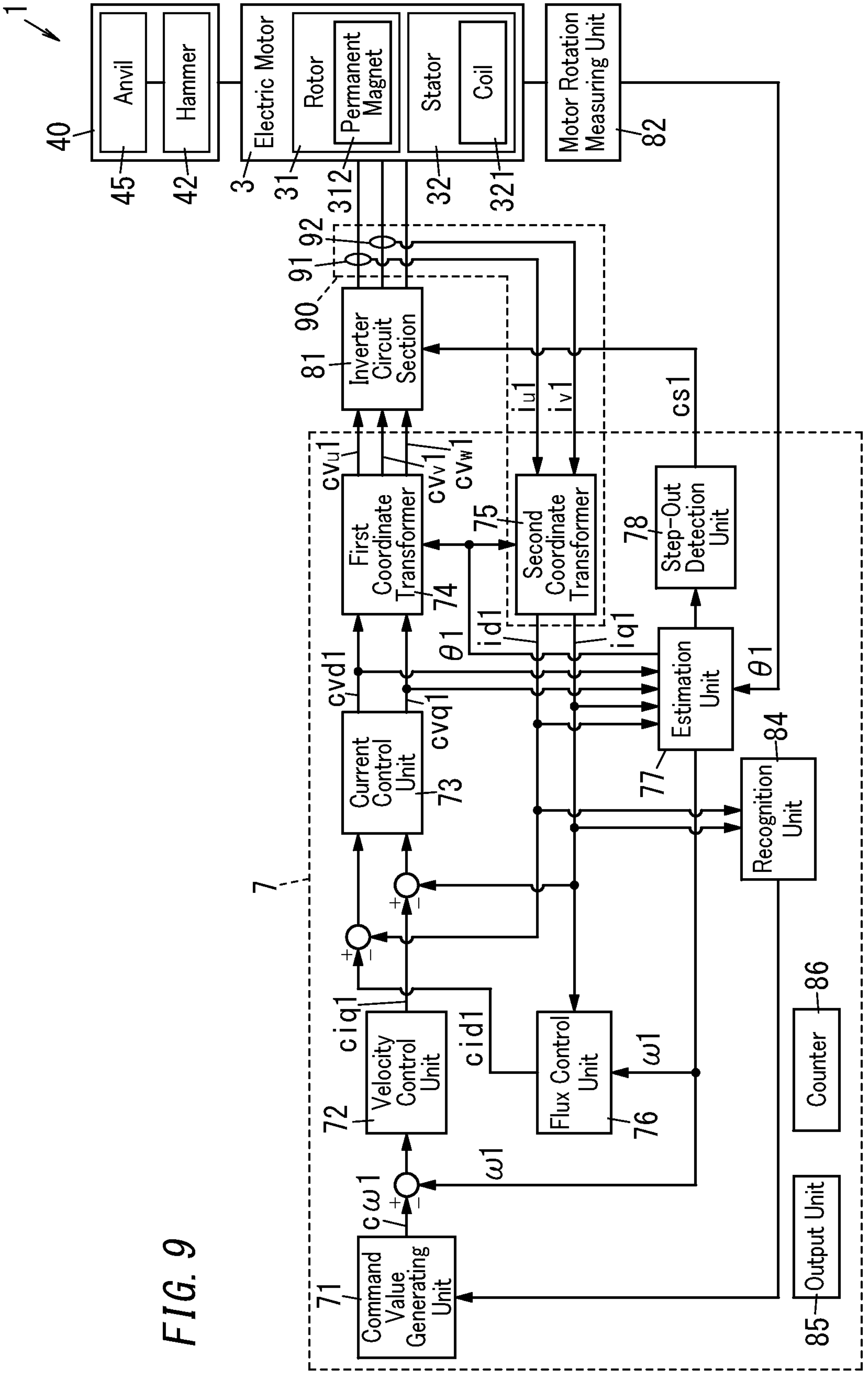
FIG. 9 is a block diagram of an impact tool according to a third embodiment.

As shown in FIG. 9, the control unit 7 includes the command value generating unit 71, the velocity control unit 72, the current control unit 73, the first coordinate transformer 74, the second coordinate transformer 75, the flux control unit 76, the estimation unit 77, and the step-out detection unit 78. The control unit 7 further includes the recognition unit 84, an output unit 85, and a counter 86.

The control unit 7 controls, based on a result of recognition obtained by the recognition unit 84, the operation of the electric motor 3. For example, the control unit 7 may increase or decrease the number of revolutions of the electric motor 3 according to the type, recognized by the recognition unit 84, of the behavior of the impact mechanism 40 that is performing an impact operation. The recognition unit 84 according to this embodiment is included in the control unit 7. However, this is only an example and should not be construed as limiting. The recognition unit 84 does not have to be one of the constituent elements of the control unit 7.

The output unit 85 outputs the result of recognition obtained by the recognition unit 84. For example, the result of recognition obtained by the recognition unit 84 may be stored in a memory of the control unit 7 and the output unit 85 may read the result of recognition by the recognition unit 84 from the memory and output the result as an electrical signal. The output unit 85 may output the result of recognition by the recognition unit 84 to a non-transitory storage medium such as a memory card or transmit the result to an external device outside of the impact tool 1 by either wired communication or wireless communication, whichever is appropriate. Furthermore, the output unit 85 may output the result of recognition by the recognition unit 84 in real time. Alternatively, the output unit 85 may also collectively output, after machining work has been done by the impact tool 1, all results of recognition that has been made during the machining work.

In addition, the output unit 85 further includes a presentation unit. The presentation unit presents, by a sound or light, for example, the result of recognition obtained by the recognition unit 84. In other words, the output unit 85 presents, as a sound or light, for example, the result of recognition obtained by the recognition unit 84. For example, the presentation unit may include a light source such as a light-emitting diode and may change the lighting state of the light source depending on the result of recognition obtained by the recognition unit 84. Alternatively, the presentation unit may include a loudspeaker or a buzzer to emit a sound according to the type of the behavior of the impact mechanism 40 that is performing an impact operation. Still alternatively, the presentation unit may include a display to present the result of recognition obtained by the recognition unit 84.

The counter 86 counts the number of times that the impacting force has been generated in the impact mechanism 40. More specifically, the counter 86 counts the number of times that the impacting force has been generated in the impact mechanism 40 in a state where the type of its behavior recognized by the recognition unit 84 is a particular type of behavior. The particular type of behavior may be, for example, a "proper impact" which is a proper type of behavior.

(3-3) Exemplary Operation

Next, an exemplary operation of the impact tool 1 will be described with reference to FIGS. 10A-12D. Note that the first to third threshold values Th1-Th3 shown in FIGS. 10A, 11A, and 12A are different from the threshold values Th1-Th3 of the first and second embodiments.

The recognition unit 84 recognizes, based on the torque current acquisition value acquired by the acquisition unit 90, the type of the behavior of the impact mechanism 40 that is performing an impact operation. In this embodiment, the acquisition unit 90 acquires, as the torque current acquisition value, a current measured value iq1 that is an actually measured value of a torque current. The recognition unit 84 uses the current measured value iq1 as the torque current acquisition value.

Figure 10A:
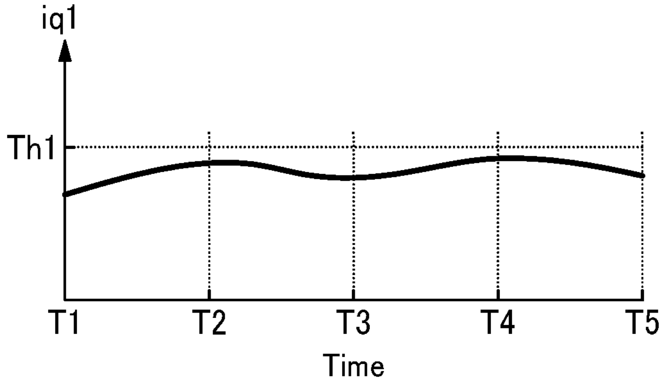
FIGS. 10A-10C illustrate a proper impact operation of the impact tool.
Figure 11A:
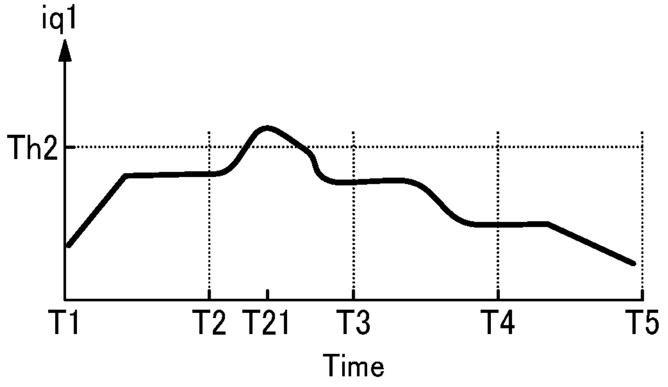
FIGS. 11A-11D illustrate a double-impact operation of the impact tool.
Figure 12A:
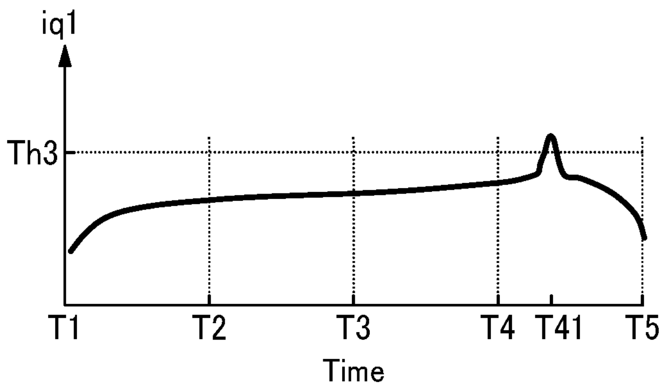
FIGS. 12A-12D illustrate a V-bottom impact operation of the impact tool.

FIGS. 10A, 11A, and 12A each indicate an exemplary variation in the current measured value iq1 with time. In each of FIGS. 10A, 11A, and 12A, the length of the interval between the points in time T1 and T5 on the axis of abscissas is equal to the length of the time it takes for the drive shaft 41 to go approximately half around, which may be about 20 ms, for example. Every time the drive shaft 41 goes approximately half around, the two projections 425 of the hammer 42 collide against, and apply rotational impact to, the two pawls 455 of the anvil 45. At each of the points in time T1 and T5, the two projections 425 of the hammer 42 collide against the two pawls 455 of the anvil 45.

That is to say, the impact mechanism 40 generates the impacting force in every predetermined impact cycle while performing the impact operation. In this embodiment, the impact cycle is equal to the length of the interval from the point in time T1 through the point in time T5 and may be about 20 ms, for example. The recognition unit 84 recognizes, based on the torque current acquisition value (current measured value iq1) between the starting point (point in time T1) of the impact cycle and the end point (point in time T5)

thereof, the type of the behavior of the impact mechanism 40 that is performing the impact operation.

More specifically, the recognition unit 84 divides a period corresponding to one impact cycle into a plurality of (e.g., four) sub-periods. Specifically, the recognition unit 84 evenly divides the period corresponding to one impact cycle into four sub-periods, namely, a sub-period between the points in time T1 and T2, a sub-period between the points in time T2 and T3, a sub-period between the points in time T3 and T4, and a sub-period between the points in time T4 and T5. The recognition unit 84 recognizes the type of the behavior of the impact mechanism 40 that is performing the impact operation by, for example, determining whether or not the current measured value iq1 exceeds a threshold value in a specific period out of these four sub-periods. Note that the point in time T5 in one impact cycle agrees with the point in time T1 in the next impact cycle.

The recognition unit 84 may recognize the type of the behavior of the impact mechanism 40 in every impact cycle. For example, the recognition unit 84 recognizes the type of the behavior in a $K^{th}$ (where K is a natural number) impact cycle as counted from the start of the impact operation independently of the type of behavior in an $L^{th}$ (where L is an arbitrary natural number different from K) impact cycle. If the impact cycle recurs N times (where N is a natural number), then the recognition unit 84 may output at most N results of recognition.

One impact cycle is calculated based on the number of revolutions of the electric motor 3. In this embodiment, a period of time that is a half of the inverse number of the number of revolutions is calculated as one impact cycle. In this embodiment, one impact cycle is calculated by the estimation unit 77. The estimation unit 77 calculates an angular velocity ω1 of the electric motor 3 by making a time differentiation on the rotational angle θ1 of the electric motor 3. The estimation unit 77 calculates the number of revolutions based on the angular velocity ω1 and then calculates one impact cycle based on the number of revolutions. Alternatively, the estimation unit 77 may also calculate one impact cycle directly based on the angular velocity ω1.

FIGS. 10B and 10C, FIGS. 11B-11D, and FIGS. 12B-12D each schematically illustrate relative positions of the hammer 42 and the anvil 45. Actually, while the hammer 42 takes one turn, the two projections 425 go over the two pawls 455 of the anvil 45 sequentially as shown in FIG. 4. In FIGS. 10B and 10C, FIGS. 11B-11D, and FIGS. 12B-12D, such an operation of the hammer 42 taking one turn is expressed by the movement of the hammer 42 to the left on the paper that causes one projection 425 to sequentially go over the two pawls 455 of the anvil 45. That is to say, in FIGS. 10B and 10C, FIGS. 11B-11D, and FIGS. 12B-12D, the region surrounding the trajectory representing the relative rotation of the two projections 425 of the hammer 42 is illustrated as being developed into a straight line. Note that in FIGS. 10B and 10C, FIGS. 11B-11D, and FIGS. 12B-12D, the two-dot chain is a line connecting together the two pawls 455 of the anvil 45 to the rotational direction of the hammer 42 and is an insubstantial one. Furthermore, in FIGS. 10B and 10C, FIGS. 11B-11D, and FIGS. 12B-12D, the arrow extended from the projection 425 indicates the trajectory of one of the two projections 425 of the hammer 42 and is also an insubstantial one.

The following description that refers to FIGS. 10A-12D will be focused on only one projection 425 out of the two projections 425 of the hammer 42 unless otherwise stated.

Figure 10B:
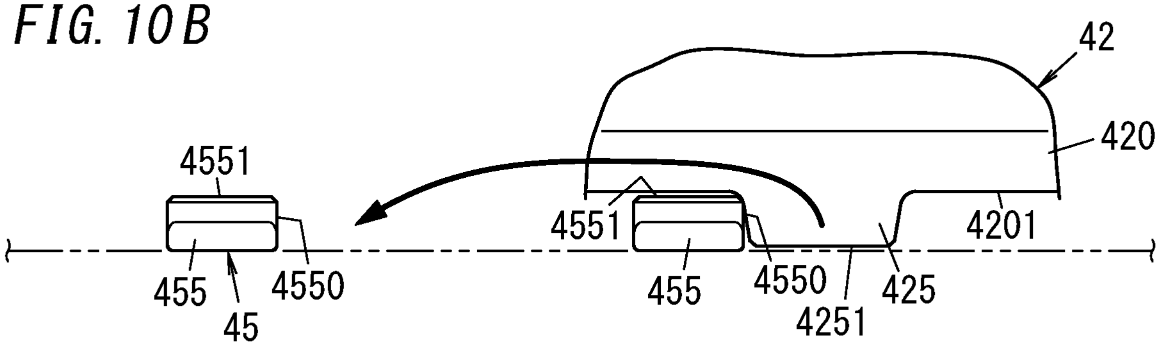
Figure 10C:
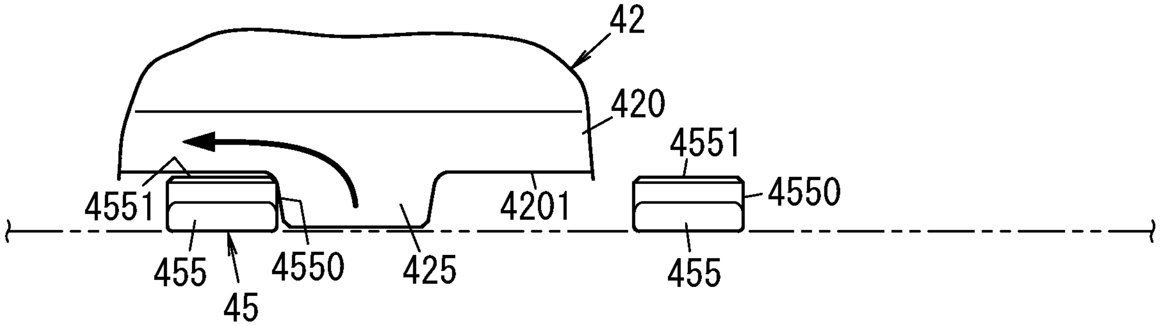

FIGS. 10A-10C illustrate the case of "proper impact" in which the impact mechanism 40 is performing the impact operation properly. That is to say, in FIGS. 10A-10C, the hammer 42 has not retreated to the maximum degree, to say the least, but has retreated by a proper distance. In addition, in FIGS. 10A-10C, after the hammer 42 has retreated, the hammer 42 is caused, by the spring force applied by the return spring 43, to advance at a proper advancement velocity. Thus, in FIGS. 10A-10C, as the hammer 42 advances, the hammer 42 rotates with respect to the anvil 45 at a proper rotational velocity. Furthermore, in FIGS. 10A-10C, there is a large area of contact between the projection 425 of the hammer 42 and the two pawls 455 of the anvil 45. More specifically, the projection 425 of the hammer 42 collides against the pawls 455 to come into contact with almost the entire side surface 4550 of each of the pawls 455. Note that when the hammer 42 advances to reach the front end of its movable range, there is a gap between a surface, facing the output shaft 61 (i.e., a front surface 4201), of the hammer body 420 and a surface, facing the drive shaft 41 (i.e., a rear surface 4551), of one of the pawls 455.

In the state shown in FIG. 10B corresponding to the point in time T1, the projections 425 of the hammer 42 (only one of which is shown in FIGS. 10B and 10C) are in contact with one of the two pawls 455 of the anvil 45. As the hammer 42 retreats (moves upward on the paper) from this state, the hammer 42 rotates by going over the two pawls 455 of the anvil 45. This brings the projections 425 of the hammer 42 into contact with the next pawl 455. That is to say, a transition is made to the state shown in FIG. 10C corresponding to the point in time T5. During the interval from the point in time T1 through the point in time T5, the hammer 42 goes half around. Thereafter, the hammer 42 goes half around by performing the same operation to recover the state shown in FIG. 10B (corresponding to the point in time T1). That is to say, every time the hammer 42 goes half around, its projections 425 alternately collide against one of the two pawls 455 after another. In other words, every time the hammer 42 goes half around, the operations shown in FIGS. 10B and 10C are repeated.

In FIG. 10A, the current measured value iq1 progresses with good stability. In FIG. 10A, the current measured value iq1 has no pulses in the interval between the point in time T1 and the point in time T5. In FIG. 10A, the current measured value iq1 remains less than the first threshold value Th1 through the interval between the points in time T1 and T5.

The recognition unit 84 determines, when finding that the current measured value iq1 remains less than the first threshold value Th1 in any of the four sub-periods from the point in time T1 through the point in time T5, for example, that the type of the behavior of the impact mechanism 40 that is performing the impact operation should be "proper impact."

Figure 11B:
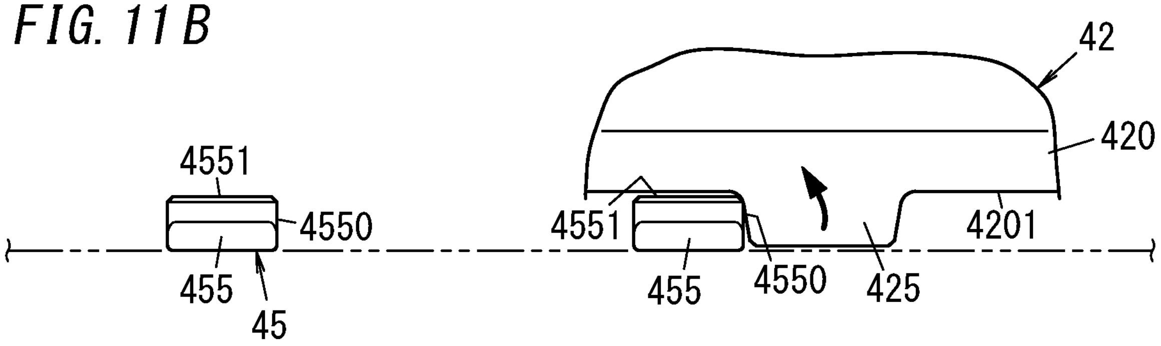
Figure 11C:
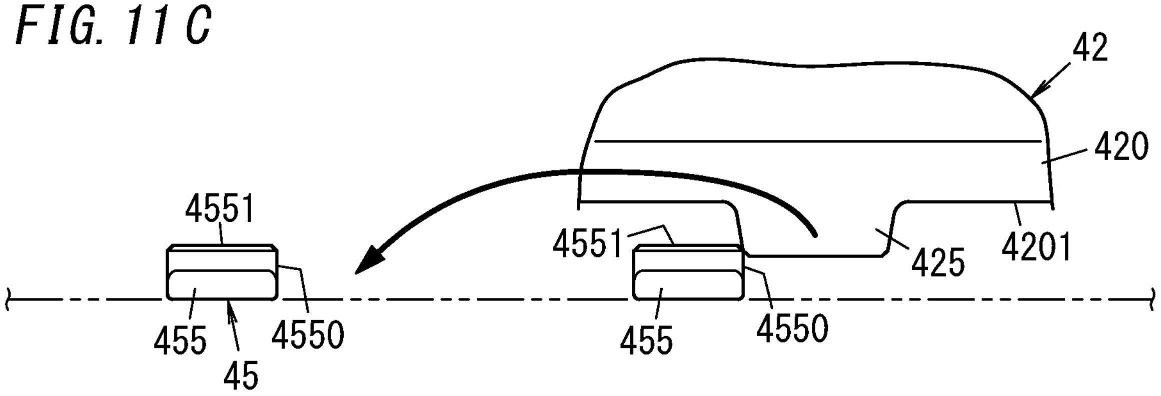
Figure 11D:
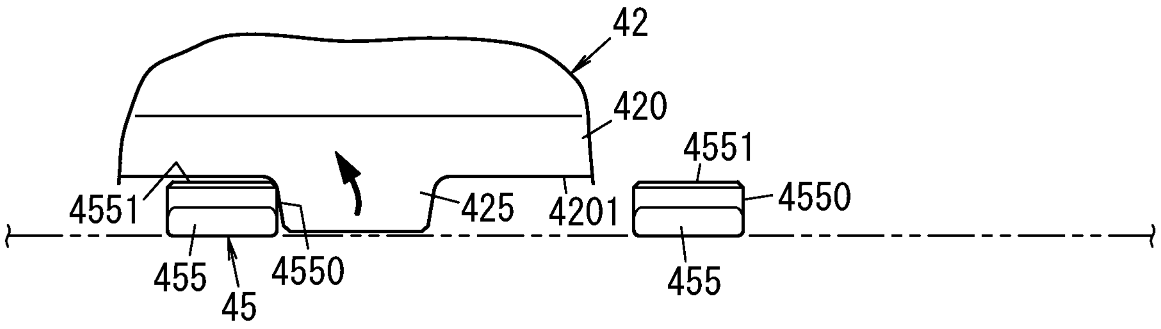

FIG. 11A illustrates an exemplary case where the impact mechanism 40 is performing a "double-impact" or "upward slide" operation as its impact operation. FIGS. 11B-11D illustrate a case in which the impact mechanism 40 is performing the "double-impact" operation. As used herein, the "double-impact" operation refers to a mode of operation in which the projections 425 of the hammer 42 collide against one of the two pawls 455 of the anvil 45 (see FIG. 11B), collide against the same pawl 455 once again (see FIG. 11C), and then collide against the other pawl 455 (see FIG. 11D). The "upward slide" operation herein refers to a mode of operation in which the projections 425 of the hammer 42 collide against one of the two pawls 455 of the anvil 45 and then move to slide along the side surface 4550 of the pawl 455 (i.e., while keeping in contact with the side surface 4550) and thereby go over the pawl 455.

The "double-impact" and "upward slide" operations may arise when the return spring 43 that causes the hammer 42 to advance applies excessive spring force. In addition, the "double-impact" and "upward slide" operations may also arise when the number of revolutions of the electric motor 3 is insufficient. Furthermore, the "double-impact" and "upward slide" operations sometimes cause shortage of the impacting force applied by the impact mechanism 40 during its impact operation.

In the case of the "double-impact" operation, during the interval from the point in time T1 when the projections 425 of the hammer 42 collide against one of the two pawls 455 of the anvil 45 through the point in time T5 when the projections 425 collide against the other pawl 455 thereof, the projections 425 once again collide, as shown in FIG. 11C, against the pawl 455 that the projections 425 have once collided against at the point in time T1. As a result, at a point in time T21 between the points in time T2 and T3, the current measured value iq1 increases temporarily as shown in FIG. 11A. In FIG. 11A, the current measured value iq1 exceeds the second threshold value Th2 at the point in time T21. The second threshold value Th2 may be the same as, or different from, the first threshold value Th1 (see FIG. 10A).

The recognition unit 84 may determine, when finding the current measured value iq1 exceeding the second threshold value Th2 during the interval between the points in time T2 and T3, for example, the type of the behavior of the impact mechanism 40 that is performing the impact operation to be either "double-impact" operation or "upward slide" operation.

Figure 12B:
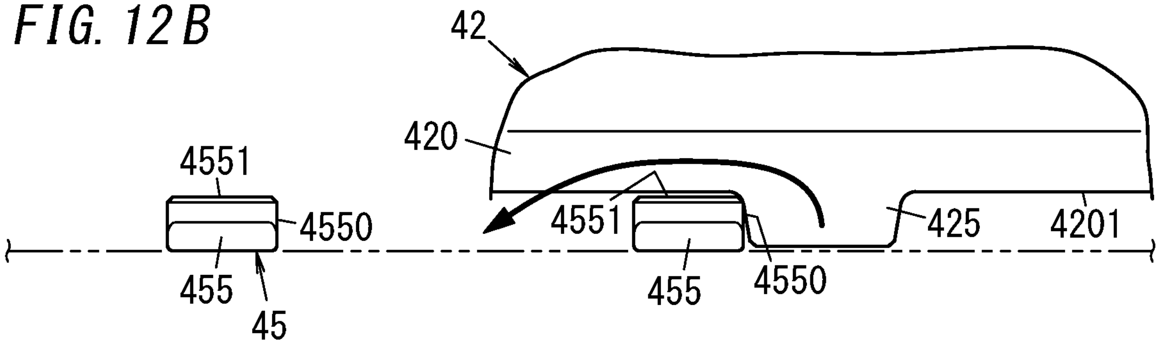
Figure 12C:
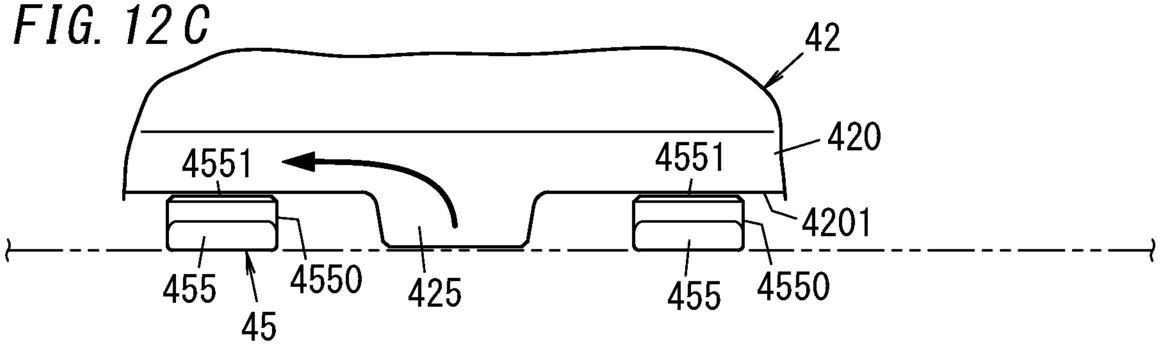
Figure 12D:
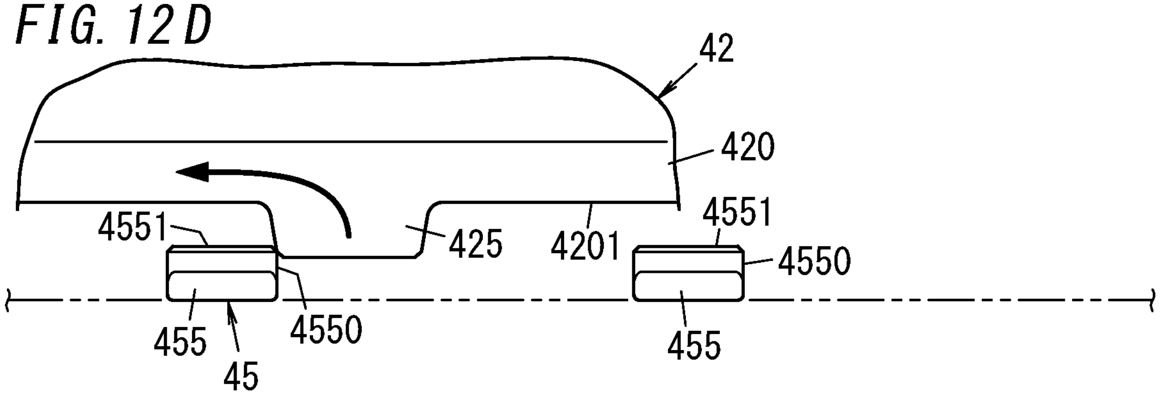

In FIGS. 12B-12D, the illustration of the hammer body 420 of the hammer 42 is not omitted in a larger part than its counterpart shown in FIGS. 10B and 10C and FIGS. 11B-11D but the hammer 42 shown in FIGS. 12B-12D has the same dimensions as its counterpart shown in FIGS. 10B and 10C and FIGS. 11B-11D.

FIGS. 12A-12D illustrate a case where the impact mechanism 40 performs a "V-bottom impact" operation. As used herein, the "V-bottom impact" operation refers to a mode of operation in which the projections 425 of the hammer 42 collide against one of the two pawls 455 of the anvil 45 (see FIG. 12B), the hammer 42 advances to reach the front end of its movable range, and then the projections 425 collide against the other of the two pawls 455 (see FIG. 12D). Advancing the hammer 42 to the front end of its movable range causes the steel spheres 49, arranged on the two V-grooves 413, respectively, to collide against the inner surface, corresponding to the middle of the V-shape, of the grooves 413 as indicated by the solid circles in FIGS. 5 and 6. In the "V-bottom impact" operation, the projections 425 of the hammer 42 go over one of the two pawls 455, move to draw a V-pattern, and then collide against the other pawl 455. That is to say, after the projections 425 of the hammer 42 have gone over the pawl 455, the hammer 42 advances (see FIG. 12C), and the impetus produced by the advancement causes the respective steel spheres 49 to collide against the inner surface, corresponding to the middle of the V-shape, of the grooves 413. Thereafter, after the hammer 42 has started retreating, the projections 425 of the hammer 42 collide against the pawl 455 of the anvil 45 as shown in FIG. 12D. In FIG. 12D, the hammer 42 has retreated, and therefore, the area of contact between the projections 425 of the hammer 42 and the pawl 455 of the anvil 45 is smaller than in the case shown in FIG. 12B.

The "V-bottom impact" operation may arise when the return spring 43 that causes the hammer 42 to advance applies excessive spring force. In addition, the "V-bottom impact" operation may also arise when the number of revolutions of the electric motor 3 is insufficient. Furthermore, the "V-bottom impact" operation sometimes causes shortage of the impacting force applied by the impact mechanism 40 while performing the impact operation.

In the case of the "V-bottom impact" operation, the respective steel spheres 49 collide against the inner surface, corresponding to the middle of the V-shape, of the grooves 413 during the interval from the point in time T1 when the projections 425 of the hammer 42 collide against one of the two pawls 455 of the anvil 45 through the point in time T5 when the projections 425 collide against the other pawl 455. As a result, at a point in time T41 between the points in time T4 and T5, the current measured value iq1 increases temporarily as shown in FIG. 12A. In FIG. 12A, the current measured value iq1 exceeds the third threshold value Th3 at the point in time T41. The third threshold value Th3 may be the same as, or different from, the first threshold value Th1 (see FIG. 10A) and the second threshold value Th2 (see FIG. 11A).

The recognition unit 84 may determine, when finding the current measured value iq1 exceeding the third threshold value Th3 during the interval between the points in time T4 and T5, for example, the type of the behavior of the impact mechanism 40 that is performing the impact operation to be the "V-bottom impact" operation.

The counter 86 counts the number of times that the impacting force has been generated in the impact mechanism 40 in a state where the type of its behavior recognized by the recognition unit 84 is "proper impact" as described above. For example, if the impact cycle recurs N times (where N is a natural number), the recognition unit 84 outputs N results of recognition corresponding to the N cycles and the counter 86 counts the number of the results of recognition indicating the "proper impact" among the N results of recognition.

The recognition unit 84 determines, based on the count of the counter 86, the state of the impact operation being performed by the impact mechanism 40. The state of the impact operation, which is output as the decision result obtained by the recognition unit 84, may be, for example, either a state where there is some abnormality in the impact operation performed or a state where there is no abnormality in the impact operation performed. In other words, the recognition unit 84 determines, based on the count of the counter 86, whether or not there is any abnormality in the impact operation performed by the impact mechanism 40. The output unit 85 notifies the user of the decision result obtained by the recognition unit 84. For example, if the count of the counter 86 is less than a predetermined number of times when the impact cycle recurs N times (where N is a natural number), the recognition unit 84 determines that there should be some abnormality in the impact operation performed by the impact mechanism 40. In response, the output unit 85 notifies the user, by a sound or light, that there is some abnormality in the impact operation performed by the impact mechanism 40. That is to say, as used herein, the "state where there is no abnormality in the impact operation" refers to not only a situation where no types of impact operations but the "proper impact" operation are included but also a state where some types of impact operations other than the "proper impact" operation are included within a tolerance range.

The control unit 7 controls the operation of the electric motor 3 based on the result of recognition obtained by the recognition unit 84. The result of recognition obtained by the recognition unit 84 includes, for example, information about the count of the counter 86. For example, if the count of the counter 86 is less than a predetermined number of times when the impact cycle recurs N times (where N is a natural number), then the control unit 7 performs the control of either increasing or decreasing the number of revolutions of the electric motor 3. Optionally, the control unit 7 may determine, according to the type of the impact operation recognized by the recognition unit 84, whether the number of revolutions of the electric motor 3 needs to be increased or decreased. As used herein, "to decrease the number of revolutions of the electric motor 3" includes stopping the electric motor 3.

The control unit 7 controls, based on the result of recognition obtained by the recognition unit 84, the operation of the electric motor 3 while the impact mechanism 40 is performing an impact operation. This allows, unless the type of the behavior of the impact mechanism 40 that is performing the impact operation is "proper impact," changing the type of control over the electric motor 3 such that the type of behavior of the impact mechanism 40 turns into the "proper impact." That is to say, the control unit 7 performs, based on the result of recognition obtained by the recognition unit 84, feedback control on the electric motor 3.

Note that the recognition unit 84 may more suitably recognize the type of the behavior of the impact mechanism 40 that is performing the impact operation when a bolt needs to be fastened rather than when a screw such as a wood screw needs to be fastened. The reason is that fastening a bolt often requires a higher torque than fastening a screw, and therefore, causes the current measured value iq1 to vary more significantly according to the type of the behavior of the impact mechanism 40 that is performing the impact operation.

As can be seen from the foregoing description, in the impact tool 1 according to this embodiment, the recognition unit 84 may recognize, by using the torque current acquisition value (current measured value iq1), the type of the behavior of the impact mechanism 40 that is performing the impact operation. This enables taking a countermeasure adaptively depending on the result of recognition obtained by the recognition unit 84.

An exemplary countermeasure may be either increasing or decreasing the number of revolutions of the electric motor 3 depending on the result of recognition obtained by the recognition unit 84. For example, the command value generating unit 71 of the control unit 7 may generate a command value cω1 of the angular velocity of the electric motor 3 based on the result of recognition obtained by the recognition unit 84. Alternatively, the control unit 7 may allow a flux-weakening current to flow through the coil 321 of the electric motor 3 to increase the number of revolutions of the electric motor 3. Still alternatively, the control unit 7 may allow a flux-strengthening current to flow through the coil 321 of the electric motor 3 to decrease the number of revolutions of the electric motor 3.

Another exemplary countermeasure may be replacing or repairing a member such as the return spring 43.

Still another exemplary countermeasure may be allowing the control unit 7 to continue performing the same type of control on the electric motor 3 if the result of recognition obtained by the recognition unit 84 is "proper impact."

In addition, the impact tool 1 according to this embodiment adopts a vector control of controlling the current to be supplied to the electric motor 3 based on the current measured values id1, iq1 of the d- and q-axis currents. In this impact tool 1, the acquisition unit 90 which is also a constituent element for use to perform the vector control may be used as a constituent element for acquiring the current measured value iq1. Then, the recognition unit 84 recognizes, based on the current measured value iq1 acquired by the acquisition unit 90, the type of the behavior of the impact mechanism 40 that is performing the impact operation. That is to say, the impact tool 1 does not have to include a constituent element dedicated to acquiring the current measured value iq1 separately from the constituent element for performing the vector control. This may reduce an increase in the number of members required for the impact tool 1.

Also, one of a plurality of tip tools of multiple different types having mutually different shapes, rigidities, or any other parameters may be attached to the output shaft 61. The type of the behavior of the impact mechanism 40 may vary due to the difference in type, shape, rigidity, or any other parameter between the tip tools. Even in such a situation, the recognition unit 84 may also recognize the type of the behavior of the impact mechanism 40 based on the torque current acquisition value (current measured value iq1). In addition, the control unit 7 controls the operation of the electric motor 3 based on the result of recognition obtained by the recognition unit 84. This enables the control unit 7 to control the electric motor 3 such that the type of the behavior of the impact mechanism 40 that is performing the impact operation is the "proper impact" even if the type, shape, rigidity, or any other parameter of the tip tool is changed.

In addition, the designer or any other person may analyze the cause of the abnormality of the impact tool 1 based on the result of recognition obtained by the recognition unit 84.

(First Variation of Third Embodiment)

As described for the third embodiment, the recognition unit 84 may recognize the type of the behavior of the impact mechanism 40 in every impact cycle. According to one variation, the recognition unit 84 may recognize, based on the result of recognition obtained on an impact cycle basis, the type of the behavior of the impact mechanism 40 over a period including a plurality of impact cycles. For example, if the impact cycle recurs N times (where N is a natural number), the recognition unit 84 may output N results of recognition for the N impact cycles and may output, as the result of recognition for the N cycles, the type of the behavior recognized most frequently in the N results of recognition.

(Second Variation of Third Embodiment)

The recognition unit 84 may recognize the type of the behavior of the impact mechanism 40 that is performing the impact operation by comparing the current measured value iq1 with each of a plurality of model waveforms and calculating the rate of matching between the current measured value iq1 and each of the model waveforms. The plurality of model waveforms correspond one to one to multiple types of behavior such as "proper impact," "double-impact," and "upward slide." The plurality of model waveforms may be stored, for example, in advance in a memory of a computer system serving as the control unit 7. The recognition unit 84 compares the current measured value iq1 with each of the plurality of model waveforms and outputs, as the result of recognition, the type of the behavior corresponding to a model waveform with the highest matching rate with respect to the current measured value iq1.

(Third Variation of Third Embodiment)

In the third embodiment described above, the recognition unit 84 recognizes the type of the behavior of the impact mechanism 40 that is performing the impact operation to be "proper impact," "double-impact," "upward slide," or "V-bottom impact." However, these are only exemplary types of behavior of the impact mechanism 40. Alternatively, the recognition unit 84 may also recognize, for example, the "maximum retreat" of the hammer 42 to be another type of behavior of the impact mechanism 40.

When the hammer 42 makes the maximum retreat, the behavior of the hammer 42 becomes more unstable than in a situation where the hammer 42 retreats by a proper distance. That is to say, in the former situation, even if force is applied to the hammer 42 in such a direction in which the hammer 42 is usually caused to retreat, the hammer 42 cannot retreat any sealing step. In addition, the force that usually causes the hammer 42 to retreat will be absorbed into the hammer 42. This could shorten the life of the hammer 42.

Thus, the recognition unit 84 may detect the maximum retreat of the hammer 42 as one type of behavior of the impact mechanism 40 that is performing the impact operation. For example, the recognition unit 84 detects, when finding the absolute value of an instantaneous value of the current measured value iq1 of the torque current exceeding a threshold value, that the maximum retreat of the hammer 42 has occurred. This threshold value is different from any of the first to third threshold values Th1—Th3 described above.

In addition, the recognition unit 84 may also recognize a particular status of occurrence of the maximum retreat as one type of behavior of the impact mechanism 40. For example, the recognition unit 84 may recognize, for example, a status where there are the signs of the maximum retreat as one type of behavior of the impact mechanism 40.

Furthermore, the recognition unit 84 may also recognize an "upper surface slide" as another type of behavior of the impact mechanism 40 that is performing an impact operation. As used herein, the "upper surface slide" refers to an operation in which in the direction in which the hammer 42 advances, the projections 425 of the hammer 42 come into contact with one of the two pawls 455 of the anvil 45. That is to say, in the "upper surface slide" operation, the front surface 4251 (i.e., a surface facing the output shaft 61) of each of the projections 425 comes into contact with the rear surface 4551 (i.e., a surface facing the drive shaft 41) of the pawl 455 (see FIG. 10B).

Furthermore, the recognition unit 84 may also recognize a "light impact" as still another type of behavior of the impact mechanism 40 that is performing an impact operation. As used herein, the "light impact" refers to an operation in which the projections 425 of the hammer 42 collide against the pawl 455 of the anvil 45 in only restricted areas around the front end of the projections 425 and around the rear end of the pawl 455 as shown in FIG. 11C. In the case of the "light impact," the projections 425 do not collide against the same pawl 455 twice or more unlike the case of "double-impact."

The "upper surface slide" and "light impact" operations may occur, for example, when the number of revolutions of the electric motor 3 is relatively large. In addition, the "upper surface slide" and "light impact" operations may also occur when the return spring 43 that causes the hammer 42 to advance has insufficient spring force. Furthermore, the "upper surface slide" and "light impact" operations could cause the impact operation performed by the impact mechanism 40 to have excessive impacting force.

The recognition unit 84 may determine, based on the rate of matching between a model waveform corresponding to the "light impact" and the current measured value iq1, for example, whether or not the type of the behavior of the impact mechanism 40 that is performing the impact operation is the "upper surface slide" operation and whether or not the type of the behavior of the impact mechanism 40 that is performing the impact operation is the "light impact" operation.

The control unit 7 may decrease, when the recognition unit 84 detects any behavior corresponding to an excessive number of revolutions of the electric motor 3, the number of revolutions of the electric motor 3. Examples of behavior corresponding to an excessive number of revolutions of the electric motor 3 include "maximum retreat," "upper surface slide," and "light impact." Optionally, when the recognition unit 84 detects any behavior corresponding to an insufficient number of revolutions of the electric motor 3, the control unit 7 may increase the number of revolutions of the electric motor 3. Examples of behavior corresponding to the insufficient number of revolutions of the electric motor 3 include "double-impact," "upward slide," and "V-bottom impact" operations.

(Fourth Variation of Third Embodiment)

As in the third embodiment described above, the acquisition unit 90 acquires the value of a torque current supplied to the coil 321 of the electric motor 3 and the value of an excitation current supplied to the coil 321. The recognition unit 84 recognizes, based on the torque current acquisition value (current measured value iq1) as a value of the torque current acquired by the acquisition unit 90 and the excitation current acquisition value (current measured value id1) as a value of the excitation current acquired by the acquisition unit 90, the type of the behavior of the impact mechanism 40 that is performing an impact operation. The acquisition unit 90 acquires actually measured values of the torque current and excitation current (i.e., the current measured values iq1, id1) as the torque current acquisition value and the excitation current acquisition value.

As in the third embodiment, the recognition unit 84 evenly divides one period corresponding to one impact cycle into four sub-periods, namely, a sub-period between the points in time T1 and T2, a sub-period between the points in time T2 and T3, a sub-period between the points in time T3 and T4, and a sub-period between the points in time T4 and T5. The recognition unit 84 obtains the number of pulses of the current measured value id1 in each of these four sub-periods and recognizes, based on the result, the type of the behavior of the impact mechanism 40 that is performing the impact operation.

The recognition unit 84 obtains a final decision result on the basis of a decision result based on the current measured value id1 and a decision result based on the current measured value iq1. For example, when finding that the decision result based on the current measured value id1 and the decision result based on the current measured value iq1 agree with each other, the recognition unit 84 regards the decision result as the final decision result. On the other hand, when finding that the decision result based on the current measured value id1 and the decision result based on the current measured value iq1 disagree with each other, the recognition unit 84 regards the final decision result as "abnormal." That is to say, in that case, the recognition unit 84 decides that the type of the behavior of the impact mechanism 40 should not be "proper impact" to say the least.

In addition, the recognition unit 84 may change the weights applied to the current measured value id1 and the current measured value iq1 with respect to at least some types of behavior. In the impact tool 1 according to the third embodiment, the "maximum retreat" and "upper surface slide" operations may be recognized easily based on the current measured value id1, while the "double-impact," "upward slide," and "V-bottom impact" operations may be recognized easily based on the current measured value iq1. Thus, if the result of recognition based on the current measured value id1 is either "maximum retreat" or "upper surface slide" and the result of recognition based on the current measured value iq1 is "proper impact," then the recognition unit 84 may regard the result of recognition based on the current measured value id1 as the final result of recognition. On the other hand, if the result of recognition based on the current measured value id1 is "proper impact" and the result of recognition based on the current measured value iq1 is "double-impact," "upward slide," or "V-bottom impact," then the recognition unit 84 may regard the result of recognition based on the current measured value iq1 as the final result of recognition.

(Other Variations of Third Embodiment)

Next, other variations of the third embodiment will be enumerated one after another. Optionally, the variations to be described below may be adopted in combination as appropriate. Alternatively, any of the variations to be described below may be adopted as appropriate in combination with any of the variations described above.

The counter 86 may count the numbers of the respective results of recognition obtained by the recognition unit 84. For example, the counter 86 may count at least one of the number of times the "proper impact" is detected, the combined number of times the "double-impact" and "upward slide" are detected, or the number of times the "V-bottom impact" is detected.

If the control unit 7 changes the number of revolutions of the electric motor 3 based on the result of recognition obtained by the recognition unit 84, a maximum magnitude of variation may be set with respect to the number of revolutions. If the result of recognition obtained by the recognition unit 84 is a particular result, then the control unit 7 may change the number of revolutions of the electric motor 3 by less than the maximum magnitude of variation. In addition, the control unit 7 may be configured to, when the variation in the number of revolutions of the electric motor 3 reaches the maximum magnitude of variation, stop changing the number of revolutions of the electric motor 3 any further. Alternatively, the control unit 7 may also change the number of revolutions of the electric motor 3 in every predetermined period of time until the variation in the number of revolutions of the electric motor 3 reaches the maximum magnitude of variation. Still alternatively, if the result of recognition obtained by the recognition unit 84 is a particular result, then the control unit 7 may change the number of revolutions of the electric motor 3 immediately by the maximum magnitude of variation.

The algorithm to be used by the recognition unit 84 to recognize the type of the behavior of the impact mechanism 40 that is performing an impact operation may be changed according to the type, rigidity, weight, and dimensions of the tip tool and the type of the load that is a workpiece. Examples of the type of the load include bolts, screws, and nuts.

The recognition unit 84 may recognize the type of the behavior of the impact mechanism 40 that is performing an impact operation by using, as the torque current acquisition value, a value obtained by removing a particular frequency component from the current measured value iq1.

The function of determining, based on the count of the counter 86, the state of the impact operation performed by the impact mechanism 40 may be performed by any constituent element other than the recognition unit 84.

The acquisition unit 90 does not have to be configured to acquire the current measured value id1 as the excitation current acquisition value. Alternatively, the acquisition unit 90 may also be configured to acquire a command value cid1 of the excitation current as the excitation current acquisition value. In that case, the acquisition unit 90 includes at least the flux control unit 76.

The acquisition unit 90 does not have to be configured to acquire the current measured value iq1 as the torque current acquisition value. Alternatively, the acquisition unit 90 may also be configured to acquire a command value ciq1 of the torque current as the torque current acquisition value. In that case, the acquisition unit 90 includes at least the velocity control unit 72.

Optionally, the impact tool 1 may include a shock sensor. The shock sensor outputs either a voltage or current, of which the magnitude corresponds to the magnitude of vibration applied to the shock sensor. The counter 86 may count, based on the output of the shock sensor, the number of times that the impacting force has been generated in the impact mechanism 40. The shock sensor has only to be provided at a position to which the vibration generated by the impact mechanism 40 is transmitted. The shock sensor may be provided either in the vicinity of the impact mechanism 40 or in the vicinity of the control unit 7, for example.

Fourth Embodiment

Next, an impact tool 1 according to a fourth embodiment will be described with reference to FIGS. 13A-17C. In the following description, any constituent element of this fourth embodiment, having the same function as a counterpart of the third embodiment described above, will be designated by the same reference numeral as that counterpart's, and description thereof will be omitted herein.

The impact tool 1 according to this embodiment recognizes the type of the behavior of the impact mechanism 40 by a different method from the one adopted in the third embodiment. In the other respects, the impact tool 1 has the same configuration and performs the same operation as its counterpart of the third embodiment described above. As for a block diagram of the impact tool 1 according to this embodiment, see FIG. 9.

The behavior decision unit includes the recognition unit 84 (see FIG. 9). The recognition unit 84 recognizes, based on an excitation current acquisition value that is a value of an excitation current acquired by the acquisition unit 90, the type of the behavior of the impact mechanism 40 that is performing the impact operation. In this embodiment, the acquisition unit 90 acquires the current measured value id1 as an actually measured value of the excitation current as the excitation current acquisition value. The recognition unit 84 uses the current measured value id1 as the excitation current acquisition value.

FIGS. 13A, 14A, 15A, 16, and 17A each indicate an exemplary variation in the current measured value id1 with time. The points in time T1-T5 shown on the axis of abscissas in FIGS. 13A, 14A, 15A, 16, and 17A respectively correspond to the points in time T1-T5 shown in FIGS. 10A, 11A, and 12A. The recognition unit 84 recognizes, based on an excitation current acquisition value (current measured value id1) between the starting point of an impact cycle (at the point in time T1) and the end point thereof (at the point in time T5), the type of the behavior of the impact mechanism 40 that is performing an impact operation.

More specifically, the recognition unit 84 divides one period corresponding to one impact cycle into a plurality of (e.g., four) sub-periods. Specifically, the recognition unit 84 evenly divides the period corresponding to one impact cycle into four sub-periods, namely, a sub-period between the points in time T1 and T2, a sub-period between the points in time T2 and T3, a sub-period between the points in time T3 and T4, and a sub-period between the points in time T4 and T5. The recognition unit 84 recognizes the type of the behavior of the impact mechanism 40 that is performing the impact operation by, for example, determining whether or not the current measured value id1 exceeds a threshold value in a specific period out of these four sub-periods. Note that the point in time T5 in one impact cycle agrees with the point in time T1 in the next impact cycle. That is to say, the point in time T5 is not only the end point of one impact cycle but also the starting point of the next impact cycle as well.

The recognition unit 84 may recognize the type of the behavior of the impact mechanism 40 in every impact cycle. For example, the recognition unit 84 recognizes the type of the behavior in a $K^{th}$ (where K is a natural number) impact cycle as counted from the start of the impact operation independently of the type of behavior in an $L^{th}$ (where L is an arbitrary natural number different from K) impact cycle. If the impact cycle recurs N times (where N is a natural number), then the recognition unit 84 may output at most N results of recognition.

FIGS. 13B and 13C, FIGS. 14B-14D, FIGS. 15B-15D, and FIGS. 17B and 17C each schematically illustrate relative positions of the hammer 42 and the anvil 45. Actually, while the hammer 42 takes one turn, the two projections 425 thereof go over the two pawls 455 of the anvil 45 sequentially as shown in FIG. 4. In FIGS. 13B and 13C, FIGS. 14B-14D, FIGS. 15B-15D, and FIGS. 17B and 17C, such an operation of the hammer 42 taking one turn is expressed by the movement of the hammer 42 to the left on the paper that causes one projection 425 thereof to sequentially go over the two pawls 455 of the anvil 45. That is to say, in FIGS. 13B and 13C, FIGS. 14B-14D, FIGS. 15B-15D, and FIGS. 17B and 17C, the region surrounding the trajectory representing the relative rotation of the two projections 425 of the hammer 42 is illustrated as being developed into a straight line. Note that in FIGS. 13B and 13C, FIGS. 14B-14D, FIGS. 15B-15D, and FIGS. 17B and 17C, the two-dot chain is a line connecting the two pawls 455 of the anvil 45 to the rotational direction of the hammer 42 and is an insubstantial one. Furthermore, in FIGS. 13B and 13C, FIGS. 14B-14D, FIGS. 15B-15D, and FIGS. 17B and 17C, the arrow extended from the projection 425 indicates the trajectory of one of the two projections 425 of the hammer 42 and is also an insubstantial one.

In the exemplary operations shown in FIGS. 13A-17C, the command value cid1 of the excitation current is always equal to zero.

The following description that refers to FIGS. 13A-17C will be focused on only one projection 425 out of the two projections 425 of the hammer 42 unless otherwise stated.

Figure 13A:
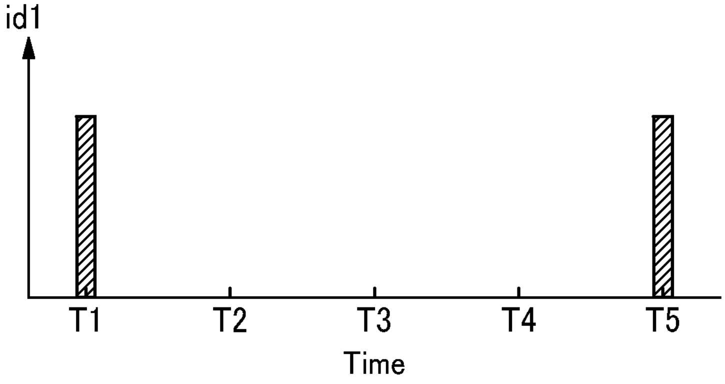
FIGS. 13A-13C illustrate a proper impact operation of an impact tool according to a fourth embodiment.
Figure 13B:
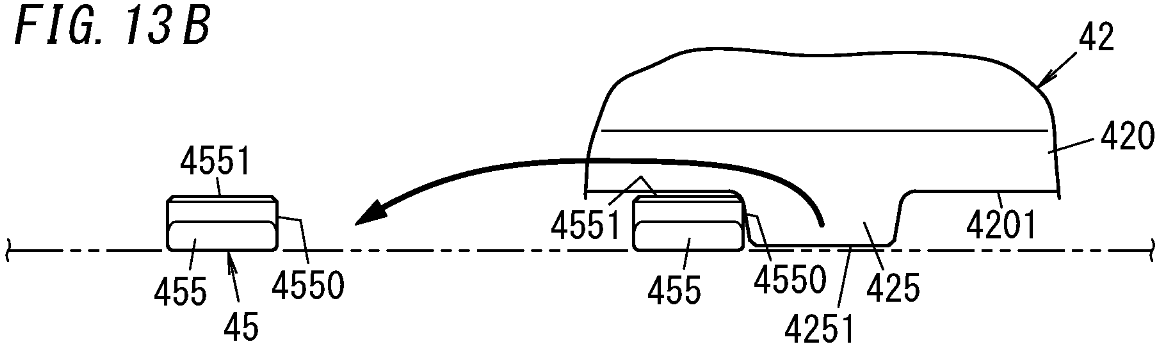
Figure 13C:
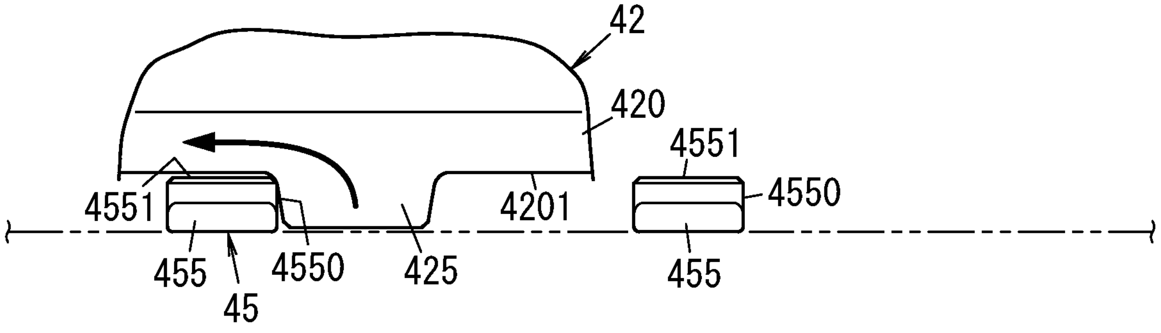

FIGS. 13A-13C illustrate the case of "proper impact" in which the impact mechanism 40 is performing the impact operation properly. That is to say, in FIGS. 13A-13C, the hammer 42 has not retreated to the maximum degree, to say the least, but has retreated by a proper distance. In addition, in FIGS. 13A-13C, after the hammer 42 has retreated, the hammer 42 is caused, by the spring force applied by the return spring 43, to advance at a proper advancement velocity. Thus, in FIGS. 13A-13C, as the hammer 42 advances, the hammer 42 rotates with respect to the anvil 45 at a proper rotational velocity. Furthermore, in FIGS. 13A-13C, there is a large area of contact between the projection 425 of the hammer 42 and the two pawls 455 of the anvil 45. More specifically, the projections 425 of the hammer 42 collide against the pawls 455 to come into contact with almost the entire side surface 4550 of each of the pawls 455. Note that when the hammer 42 advances to reach the front end of its movable range, there is a gap between a surface, facing the output shaft 61 (i.e., a front surface 4201), of the hammer body 420 and a surface, facing the drive shaft 41 (i.e., a rear surface 4551), of one of the pawls 455.

In the state shown in FIG. 13B corresponding to the point in time T1, the projections 425 of the hammer 42 (only one of which is shown in FIGS. 13B and 13C) are in contact with one of the two pawls 455 of the anvil 45. As the hammer 42 retreats (moves upward on the paper) from this state, the hammer 42 rotates by going over the two pawls 455 of the anvil 45. This causes the projections 425 of the hammer 42 to collide against the next pawl 455. That is to say, a transition is made to the state shown in FIG. 13C corresponding to the point in time T5. During the interval from the point in time T1 through the point in time T5, the hammer 42 goes half around. Thereafter, the hammer 42 goes half around by performing the same operation to recover the state shown in FIG. 13B (corresponding to the point in time T1). That is to say, every time the hammer 42 goes half around, its projections 425 alternately collide against one of the two pawls 455 after another. In other words, every time the hammer 42 goes half around, the operations shown in FIGS. 13B and 13C are repeated.

In FIG. 13A, at each of the points in time T1 and T5, a single pulse is generated in the current measured value id1. In other words, in FIG. 13A, a single pulse is generated in the current measured value id1 at every starting point of one impact cycle. The recognition unit 84 determines, when finding that a single pulse is generated during a predetermined period centered around each of the points in time T1 and T5 (in other words, the starting point of one impact cycle) and that no pulses are generated at any other point in time, that the type of the behavior of the impact mechanism 40 that is performing an impact operation should be "proper impact." In this example, an exemplary length of the predetermined period may be 20% of the length of the interval between the points in time T1 and T2. In other words, an exemplary length of the predetermined period may be 5% of one impact cycle.

Figure 14A:
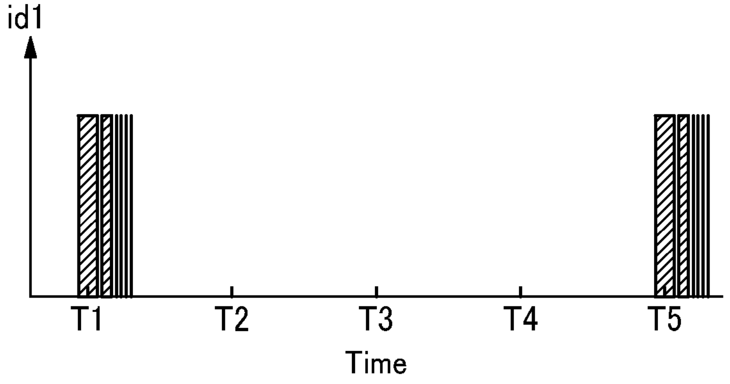
FIGS. 14A-14D illustrate a double-impact operation of the impact tool.
Figure 14B:
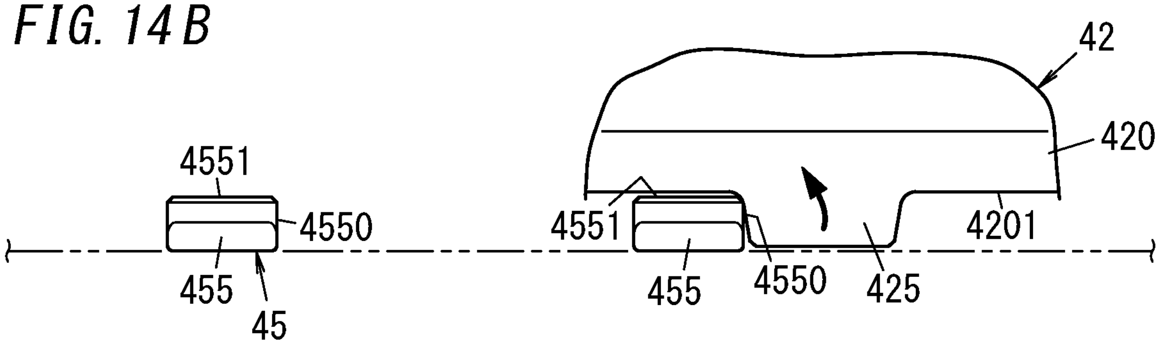
Figure 14C:
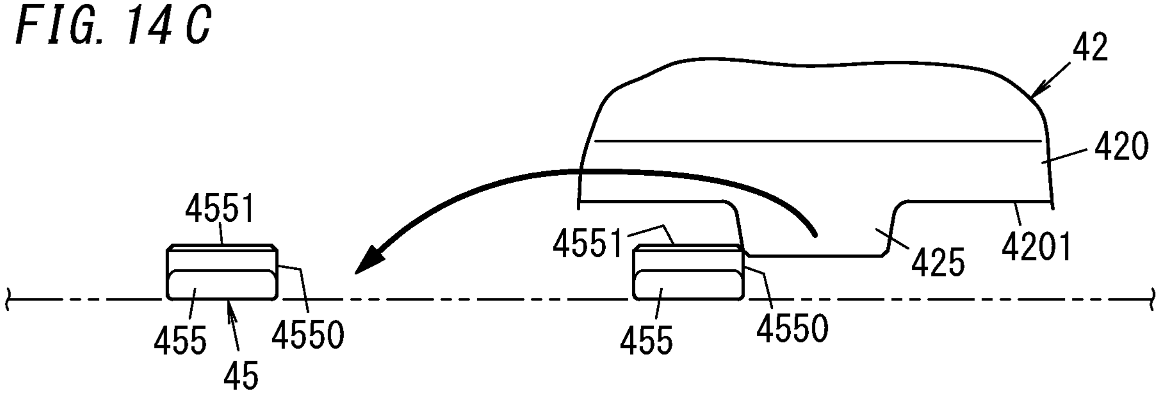
Figure 14D:
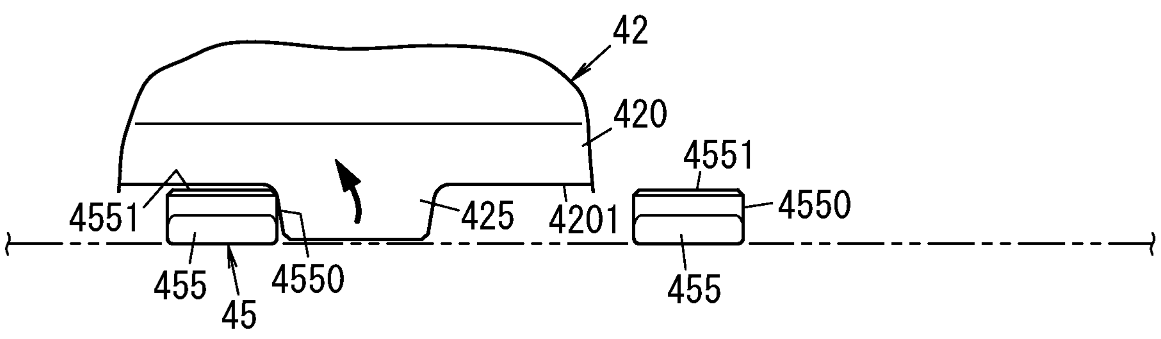

FIG. 14A illustrates an exemplary case where the impact mechanism 40 is performing a "double-impact" or "upward slide" operation as its impact operation. FIGS. 14B-14D illustrate a case in which the impact mechanism 40 is performing the "double-impact" operation. In this instance of the "double-impact" operation, during the interval between the point in time T1 when the projections 425 of the hammer 42 collide against one of the two pawls 455 of the anvil 45 and the point in time T5 when the projections 425 of the hammer 42 collide against the other pawl 455, the projections 425 collide once again against the pawl 455 that the projections 425 have collided against at the point in time T1 as shown in FIG. 14C. Thus, multiple pulses are generated during the interval between the points in time T1 and T2 as shown in FIG. 14A. In other words, multiple pulses are generated before a certain period of time passes since the beginning of an impact cycle as shown in FIG. 14A.

The recognition unit 84 may determine, for example, when finding that at least a predetermined number of pulses have been generated during the interval from the point in time T1 through the point in time T2 (in other words, before a certain period of time passes since the beginning of one impact cycle), that the type of the behavior of the impact mechanism 40 that is performing an impact operation should be either "double-impact or upward slide."

Figure 15A:
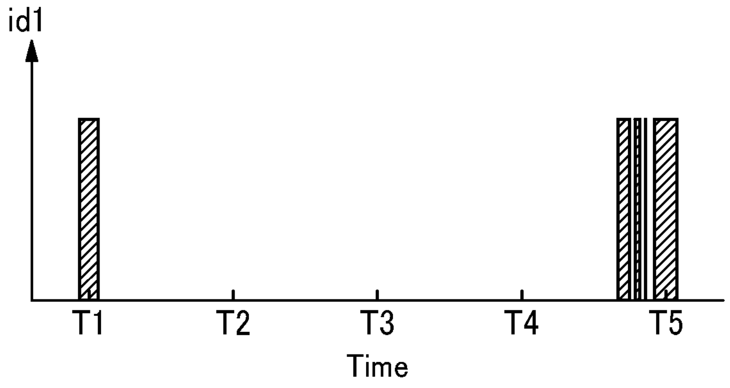
FIGS. 15A-15D illustrate a V-bottom impact operation of the impact tool.
Figure 15B:
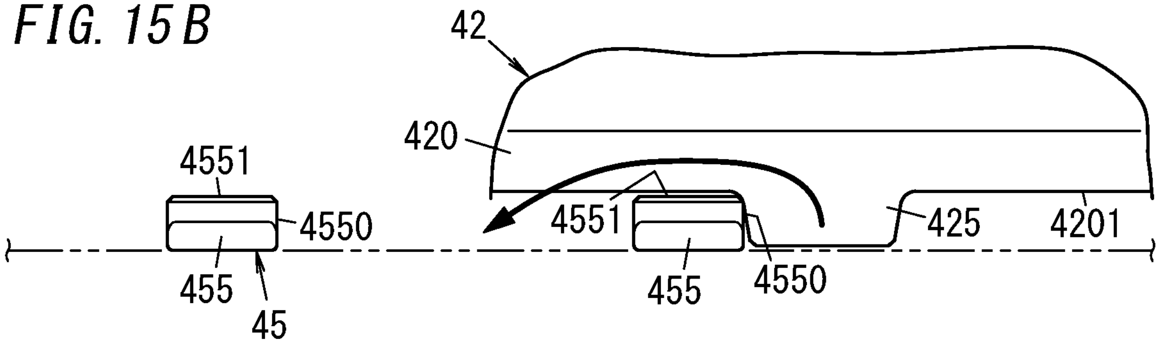
Figure 15C:
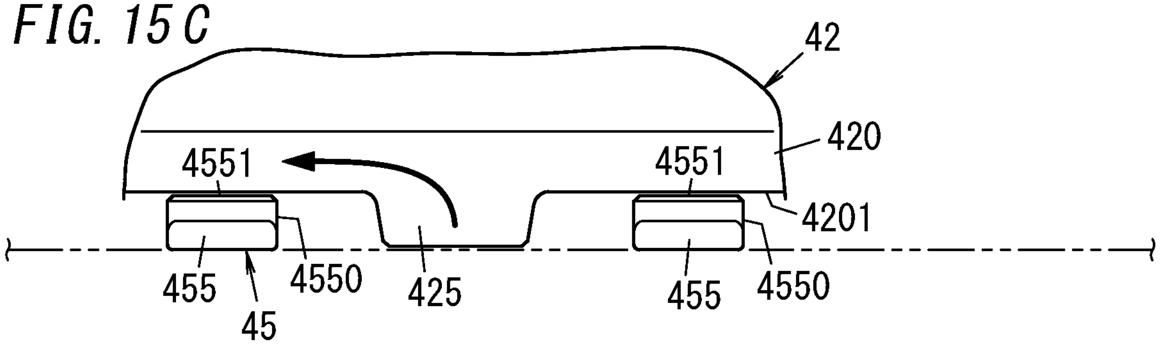
Figure 15D:
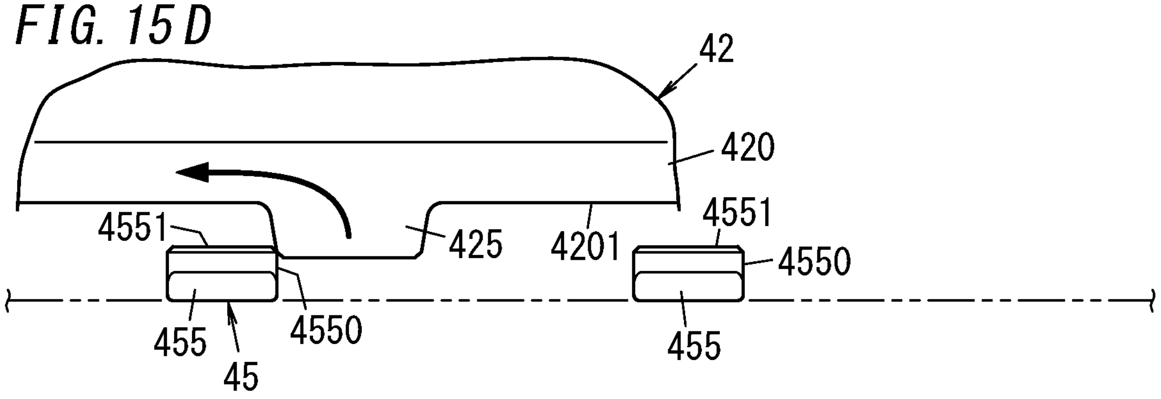

In FIGS. 15B-15D, the illustration of the hammer body 420 of the hammer 42 is not omitted in a larger part than its counterpart shown in FIGS. 13B and 13C and FIGS. 14B-14D but the hammer 42 shown in FIGS. 15B-15D has the same dimensions as its counterpart shown in FIGS. 13B and 13C and FIGS. 14B-14D.

FIGS. 15A-15D illustrate a case where the impact mechanism 40 performs a "V-bottom impact" operation. In this instance of the "V-bottom impact" operation, the respective steel spheres 49 collide against the inner surface, corresponding to the middle of the V-shape, of the grooves 413 during the interval from the point in time T1 when the projections 425 of the hammer 42 collide against one of the two pawls 455 of the anvil 45 through the point in time T5 when the projections 425 collide against the other pawl 455. As a result, multiple pulses are generated during the interval between the points in time T4 and T5 as shown in FIG. 15A. In other words, multiple pulses are generated during the interval from a point in time, which is earlier by a certain period of time than the end of an impact cycle, through the end of the impact cycle as shown in FIG. 15A.

The recognition unit 84 may determine, for example, when finding that at least a predetermined number of pulses have been generated during the interval from the point in time T4 through the point in time T5 (in other words, from a point in time, which is earlier by a certain period of time than the end of an impact cycle, through the end of the impact cycle), that the type of the behavior of the impact mechanism 40 that is performing an impact operation should be "V-bottom impact."

Figure 16:
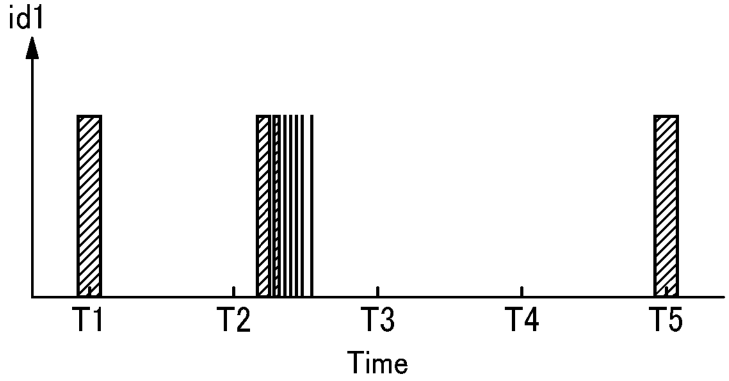
FIG. 16 illustrates a maximum retreat operation of the impact tool.

FIG. 16 illustrates a case where the type of the impact operation performed by the impact mechanism 40 is the "maximum retreat" operation. That is to say, FIG. 16 shows an exemplary current measured value id1 when the hammer 42 retreat to the maximum degree. In FIG. 16, a single pulse is generated in the current measured value id1 at each of the points in time T1 and T5. In addition, during the interval between the points in time T2 and T3, multiple pulses are generated. In other words, multiple pulses are generated during a half cycle that forms the first half of one impact cycle.

The recognition unit 84 may determine, for example, when finding that at least a predetermined number of pulses have been generated during the interval from the point in time T2 through the point in time T3 (in other words, during a half cycle that forms the first half of one impact cycle), that the type of the behavior of the impact mechanism 40 that is performing an impact operation should be "maximum retreat."

When the hammer 42 makes the maximum retreat, the behavior of the hammer 42 is more unstable than when the hammer 42 retreats by a proper distance. That is to say, in such a situation, even if force is applied to the hammer 42 in such a direction in which the hammer 42 is usually caused to retreat, the hammer 42 cannot retreat any further. In addition, in such a situation, the force that causes the hammer 42 to retreat will be absorbed into the hammer 42. This could shorten the life of the hammer 42. Making the recognition unit 84 detect the maximum retreat may allow, for example, the control unit 7 to a take a countermeasure such as decreasing the number of revolutions of the electric motor 3 to cancel the maximum retreat in response to the detection.

Figure 17A:
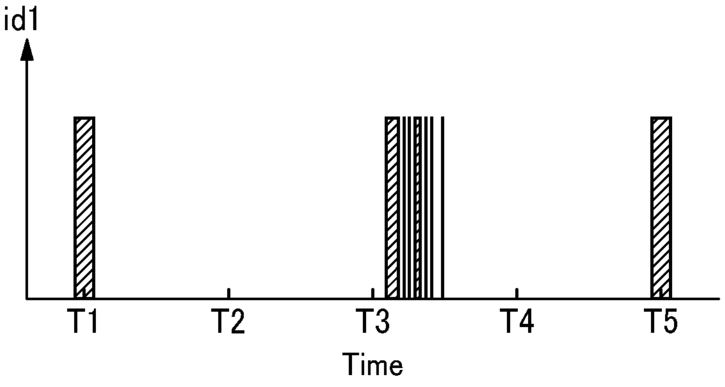
FIGS. 17A-17C illustrate an upper surface slide operation of the impact tool.
Figure 17B:
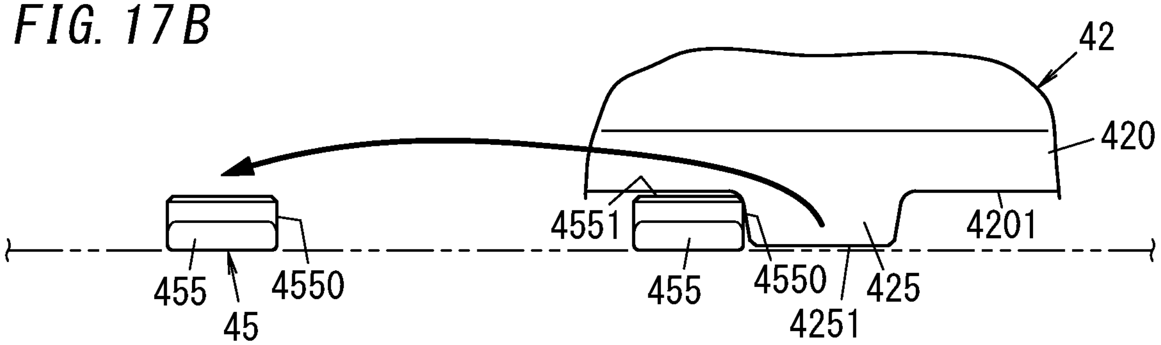
Figure 17C:
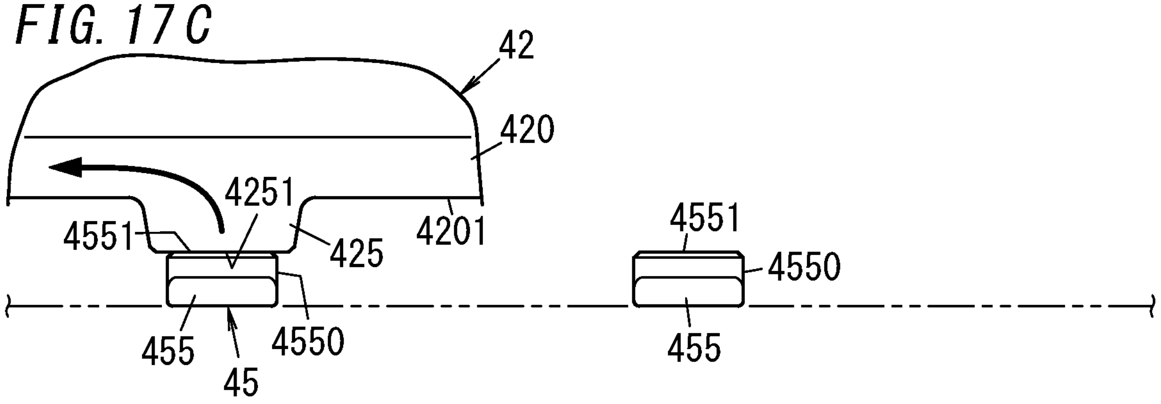

FIGS. 17A-17C illustrate a case where the type of the impact operation performed by the impact mechanism 40 is the "upper surface slide" operation. As used herein, the "upper surface slide" refers to an operation in which in the direction in which the hammer 42 advances, the projections 425 of the hammer 42 come into contact with one of the two pawls 455 of the anvil 45 (see FIG. 17C). That is to say, in the "upper surface slide" operation, the front surface 4251 (i.e., a surface facing the output shaft 61) of each of the projections 425 comes into contact with the rear surface 4551 (i.e., a surface facing the drive shaft 41) of the pawl 455.

In FIG. 17B, the projections 425 of the hammer 42 collide against one of the two pawls 455 in the rotational direction of the hammer 42. Thereafter, the projections 425 go over this pawl 455 and then the front surface 4251 of the projections 425 comes into contact with the rear surface 4551 of the other pawl 455. The projections 425 move to slide on the rear surface 4551.

The "upper surface slide" operation may occur, for example, when the number of revolutions of the electric motor 3 is relatively large. In addition, the "upper surface slide" operation may also occur, for example, when the return spring 43 that causes the hammer 42 to advance has insufficient spring force. Furthermore, the "upper surface slide" operation may also cause the impact mechanism 40 to apply excessive impacting force while performing the impact operation.

In FIG. 17A, a single pulse is generated in the current measured value id1 at each of the points in time T1 and T5. In addition, multiple pulses are also generated during the interval between the points in time T3 and T4. In other words, multiple pulses are generated during a half cycle that forms the second half of one impact cycle. Thus, the recognition unit 84 determines, when finding that at least a predetermined number of pulses are generated during an interval between the points in time T3 and T4 (in other words, during a half cycle that forms the second half of one impact cycle), for example, that the type of the behavior of the impact mechanism 40 that is performing the impact operation should be the "upper surface slide" operation.

As in the third embodiment described above, the counter 86 counts the number of times that the impacting force has been generated in the impact mechanism 40 in a state where the type of its behavior recognized by the recognition unit 84 is "proper impact." The recognition unit 84 determines, based on the count of the counter 86, the state of the impact operation being performed by the impact mechanism 40. The control unit 7 controls, based on the result of recognition obtained by the recognition unit 84, the operation of the electric motor 3.

Note that the recognition unit 84 may more suitably recognize the type of the behavior of the impact mechanism 40 that is performing the impact operation when a bolt needs to be fastened rather than when a screw such as a wood screw needs to be fastened. The reason is that fastening a bolt often requires a higher torque than fastening a screw, and therefore, causes the current measured value id1 to vary more significantly according to the type of the behavior of the impact mechanism 40 that is performing the impact operation.

As can be seen from the foregoing description, in the impact tool 1 according to this embodiment, the recognition unit 84 may recognize, by using the excitation current acquisition value (current measured value id1), the type of the behavior of the impact mechanism 40 that is performing the impact operation. This enables taking a countermeasure adaptively depending on the result of recognition obtained by the recognition unit 84.

In addition, the impact tool 1 according to this embodiment adopts a vector control of controlling the current to be supplied to the electric motor 3 based on the current measured values id1, iq1 of the d- and q-axis currents. In this impact tool 1, the acquisition unit 90 which is also a constituent element for use to perform the vector control may be used as a constituent element for acquiring the current measured value id1. Then, the recognition unit 84 recognizes, based on the current measured value id1 acquired by the acquisition unit 90, the type of the behavior of the impact mechanism 40 that is performing the impact operation. That is to say, the impact tool 1 does not have to include a constituent element dedicated to acquiring the current measured value id1 separately from the constituent element for performing the vector control. This may reduce an increase in the number of members required for the impact tool 1.

Also, one of a plurality of tip tools of multiple different types having mutually different shapes, rigidities, or any other parameters may be attached to the output shaft 61. The type of the behavior of the impact mechanism 40 may vary due to the difference in type, shape, rigidity, or any other parameter between the tip tools. Even in such a situation, the recognition unit 84 may also recognize the type of the behavior of the impact mechanism 40 based on the excitation current acquisition value (current measured value id1). In addition, the control unit 7 controls the operation of the electric motor 3 based on the result of recognition obtained by the recognition unit 84. This enables the control unit 7 to control the electric motor 3 such that the type of the behavior of the impact mechanism 40 that is performing the impact operation is the “proper impact” even if the type, shape, rigidity, or any other parameter of the tip tool is changed.

In addition, the designer or any other person may analyze the cause of the abnormality of the impact tool 1 based on the result of recognition obtained by the recognition unit 84.

(First Variation of Fourth Embodiment)

As described for the fourth embodiment, the recognition unit 84 may recognize the type of the behavior of the impact mechanism 40 in every impact cycle. According to one variation, the recognition unit 84 may recognize, based on the result of recognition obtained on an impact cycle basis, the type of the behavior of the impact mechanism 40 over a period including a plurality of impact cycles. For example, if the impact cycle recurs N times (where N is a natural number), the recognition unit 84 may output N results of recognition for the N impact cycles and may output, as the result of recognition for the N cycles, the type of the behavior recognized most frequently in the N results of recognition.

(Second Variation of Fourth Embodiment)

The recognition unit 84 may recognize the type of the behavior of the impact mechanism 40 that is performing the impact operation by comparing the current measured value id1 with each of a plurality of model waveforms and calculating the rate of matching between the current measured value id1 and each of the model waveforms. The plurality of model waveforms correspond one to one to multiple types of behavior such as “proper impact,” “double-impact,” and “upward slide.” The plurality of model waveforms may be stored, for example, in advance in a memory of a computer system serving as the control unit 7. The recognition unit 84 compares the current measured value id1 with each of the plurality of model waveforms and outputs, as the result of recognition, the type of the behavior corresponding to a model waveform with the highest matching rate with respect to the current measured value id1.

(Third Variation of Fourth Embodiment)

In the fourth embodiment described above, the recognition unit 84 recognizes the type of the behavior of the impact mechanism 40 that is performing the impact operation to be “proper impact,” “double-impact,” “upward slide,” “V-bottom impact,” “maximum retreat,” or “upper surface slide.” However, these are only exemplary types of behavior of the impact mechanism 40. Alternatively, the recognition unit 84 may also detect, for example, the “light impact” as yet another type of behavior of the impact mechanism 40 that is performing an impact operation.

The recognition unit 84 may determine, based on the rate of matching between a model waveform corresponding to the “light impact” and the current measured value id1, for example, whether or not the type of the behavior of the impact mechanism 40 that is performing the impact operation is the “light impact” operation.

In addition, the recognition unit 84 may also recognize a particular status of occurrence of the maximum retreat as yet another type of behavior of the impact mechanism 40. For example, the recognition unit 84 may recognize, for example, a status where there are the signs of the maximum retreat as one type of behavior of the impact mechanism 40.

(Other Variations of Fourth Embodiment)

Next, other variations of the fourth embodiment will be enumerated one after another. Optionally, the variations to be described below may be adopted in combination as appropriate. Alternatively, any of the variations to be described below may be adopted as appropriate in combination with any of the variations described above.

The counter 86 may count the numbers of the respective results of recognition obtained by the recognition unit 84. For example, the counter 86 may count at least one of the number of times the “proper impact” is detected, the combined number of times the “double-impact” and “upward slide” are detected, the number of times the “V-bottom impact” is detected, the number of times the “maximum retreat” is detected, or the number of times the “upper surface slide” is detected.

The recognition unit 84 may recognize the type of the behavior of the impact mechanism 40 that is performing an impact operation by using, as the excitation current acquisition value, a value obtained by removing a particular frequency component from the current measured value id1.

(Recapitulation)

The embodiments and their variations described above may be specific implementations of the following aspects of the present disclosure.

An impact tool 1 according to a first aspect includes an electric motor 3, an impact mechanism 40, an acquisition unit 90, and a behavior decision unit (including a retreat detection unit 79 and a recognition unit 84). The electric motor 3 includes a permanent magnet 312 and a coil 321. The impact mechanism 40 performs an impact operation that generates impacting force by receiving motive power from the electric motor 3. The acquisition unit 90 acquires at least one of: a value of a torque current to be supplied to the coil 321; or a value of an excitation current to be supplied to the coil 321. The excitation current generates, in the coil 321, a magnetic flux causing a variation in the permanent magnet's 312 magnetic flux. The behavior decision unit makes, based on at least one of a torque current acquisition value or an excitation current acquisition value, a decision about the behavior of the impact mechanism 40. The torque current acquisition value is the value of the torque current acquired by the acquisition unit 90. The excitation current acquisition value is the value of the excitation current acquired by the acquisition unit 90.

This configuration enables making a decision about the behavior of the impact mechanism 40 by using at least one of a torque current acquisition value (current measured value iq1) or an excitation current acquisition value (current measured value id1).

In an impact tool 1 according to a second aspect, which may be implemented in conjunction with the first aspect, the behavior decision unit includes a detection unit (a retreat detection unit 79). The detection unit detects, based on at least one of the torque current acquisition value or the excitation current acquisition value, a status of occurrence of unstable behavior in the impact mechanism 40.

This configuration enables detecting the status of occurrence of unstable behavior in the impact mechanism 40 by using at least one of a torque current acquisition value (current measured value iq1) or an excitation current acquisition value (current measured value id1).

An impact tool 1 according to a third aspect, which may be implemented in conjunction with the second aspect, includes a control unit 7. The control unit 7 controls operation of the electric motor 3.

This configuration allows the impact tool 1 to control the operation of the electric motor 3 autonomously.

In an impact tool 1 according to a fourth aspect, which may be implemented in conjunction with the third aspect, the control unit 7 controls, at least unless a result of detection obtained by the detection unit (retreat detection unit 79) indicates occurrence of the unstable behavior in the impact mechanism 40, the operation of the electric motor 3 to bring a number of revolutions of the electric motor 3 closer toward a certain target value.

This configuration facilitates detecting the status of occurrence of unstable behavior in the impact mechanism 40 due to a variation in the number of revolutions of the electric motor 3.

In an impact tool 1 according to a fifth aspect, which may be implemented in conjunction with the third or fourth aspect, the control unit 7 decreases, when the detection unit (retreat detection unit 79) detects the occurrence of the unstable behavior in the impact mechanism 40, a number of revolutions of the electric motor 3.

This configuration may reduce the chances of the life of the impact tool 1 being shortened by the unstable behavior of the impact mechanism 40.

In an impact tool 1 according to a sixth aspect, which may be implemented in conjunction with any one of the third to fifth aspects, the control unit 7 controls the operation of the electric motor 3 to bring the excitation current to be supplied to the coil 321 closer toward a certain target value (command value cid1). The detection unit (retreat detection unit 79) detects, based on a difference between the target value (command value cid1) of the excitation current and an actually measured value (current measured value id1) of the excitation current, the status of occurrence of the unstable behavior in the impact mechanism 40.

This configuration enables detecting the status of occurrence of unstable behavior in the impact mechanism 40 by simple processing.

In an impact tool 1 according to a seventh aspect, which may be implemented in conjunction with any one of the second to sixth aspects, the detection unit (retreat detection unit 79) detects, based on magnitude of an AC component of the torque current acquisition value (current measured value iq1), the status of occurrence of the unstable behavior in the impact mechanism 40.

This configuration allows, even if the magnitude of a DC component of the torque current to be supplied to the electric motor 3 varies according to the magnitude of the load, for example, easily detecting the status of occurrence of the unstable behavior in the impact mechanism 40.

In an impact tool 1 according to an eighth aspect, which may be implemented in conjunction with any one of the second to seventh aspects, the detection unit (retreat detection unit 79) detects, based on an absolute value of an instantaneous value of the torque current acquisition value (current measured value iq1), the status of occurrence of the unstable behavior in the impact mechanism 40.

This configuration enables detecting the status of occurrence of unstable behavior in the impact mechanism 40 by simple processing.

In an impact tool 1 according to a ninth aspect, which may be implemented in conjunction with any one of the second to eighth aspects, the impact mechanism 40 includes an anvil 45 and a hammer 42. The anvil 45 holds a tip tool thereon. The hammer 42 moves relative to the anvil 45 and applies rotational impact to the anvil 45 by receiving the motive power from the electric motor 3. The unstable behavior is a maximum retreat of the hammer 42 to a position most distant from the anvil 45 within a movable range of the hammer 42.

This configuration enables detecting the status of occurrence of a maximum retreat and taking an appropriate measure accordingly.

In an impact tool 1 according to a tenth aspect, which may be implemented in conjunction with any one of the second to ninth aspects, supposing, with respect to the excitation current, a current flowing in a direction in which a magnetic flux that weakens the permanent magnet's 312 magnetic flux is generated in the coil 321 is a negative current, the detection unit (retreat detection unit 79) detects, based on magnitude of the excitation current acquisition value (current measured value id1) as a negative value, the status of occurrence of the unstable behavior in the impact mechanism 40.

This configuration enables detecting the status of occurrence of unstable behavior in the impact mechanism 40 by simple processing.

In an impact tool 1 according to an eleventh aspect, which may be implemented in conjunction with any one of the second to tenth aspects, the acquisition unit 90 acquires the torque current acquisition value (current measured value iq1) and the excitation current acquisition value (current measured value id1). The detection unit (retreat detection unit 79) detects, based on the torque current acquisition value and the excitation current acquisition value that have been acquired by the acquisition unit 90, the status of occurrence of the unstable behavior in the impact mechanism 40.

This configuration contributes to improving the detection accuracy compared to a situation where the detection unit (retreat detection unit 79) detects the status of occurrence of unstable behavior in the impact mechanism 40 based on either only the torque current acquisition value (current measured value iq1) or only the excitation current acquisition value (current measured value id1).

In an impact tool 1 according to a twelfth aspect, which may be implemented in conjunction with any one of the first to eleventh aspects, the behavior decision unit includes a detection unit (retreat detection unit 79). The detection unit recognizes, based on at least one of the torque current acquisition value (current measured value iq1) or the excitation current acquisition value (current measured value id1), a type of the behavior of the impact mechanism 40 that is performing the impact operation.

This configuration enables recognizing, by using at least one of a torque current acquisition value (current measured value iq1) or an excitation current acquisition value (current measured value id1), the type of the behavior of the impact mechanism 40 that is performing the impact operation.

In an impact tool 1 according to a thirteenth aspect, which may be implemented in conjunction with the twelfth aspect, the impact mechanism 40 generates the impacting force in every predetermined impact cycle while performing the impact operation. The recognition unit 84 recognizes, based on at least one of the torque current acquisition value (current measured value iq1) or the excitation current acquisition value (current measured value id1) between a beginning and an end of the impact cycle, the type of the behavior of the impact mechanism 40 that is performing the impact operation.

This configuration allows the recognition unit 84 to recognize the type of the behavior of the impact mechanism 40 responsively every time the impacting force is generated. That is to say, unlike a situation where the type of the behavior of the impact mechanism 40 is recognized based on at least one of the torque current acquisition value or the excitation current acquisition value over a period during which the impacting force is generated multiple times, the type of the behavior of the impact mechanism 40 may be recognized on a one-by-one basis every time the impacting force is generated.

In an impact tool 1 according to a fourteenth aspect, which may be implemented in conjunction with the thirteenth aspect, the impact cycle is calculated based on a number of revolutions of the electric motor 3.

This configuration enables calculating the impact cycle easily.

An impact tool 1 according to a fifteenth aspect, which may be implemented in conjunction with any one of the twelfth to fourteenth aspects, further includes an output unit 85. The output unit 85 outputs a result of recognition obtained by the recognition unit 84.

This configuration allows the user or any other person to check the result of recognition obtained by the recognition unit 84.

An impact tool 1 according to a sixteenth aspect, which may be implemented in conjunction with any one of the twelfth to fifteenth aspects, further includes a control unit 7. The control unit 7 controls the operation of the electric motor 3 based on a result of recognition obtained by the recognition unit 84.

This configuration enables controlling the operation of the electric motor 3 according to the type of the behavior of the impact mechanism 40 that is performing an impact operation.

An impact tool 1 according to a seventeenth aspect, which may be implemented in conjunction with any one of the twelfth to sixteenth aspects, further includes a counter 86. The counter 86 counts a number of times that the impacting force has been generated.

This configuration allows the user or any other person to estimate the property of the output of the counter 86 (e.g., whether the output is a normal one or not) by reference to the output of the counter 86 and the output of the recognition unit 84 in combination.

In an impact tool 1 according to an eighteenth aspect, which may be implemented in conjunction with the seventeenth aspect, the counter 86 counts the number of times that the impacting force has been generated in a state where the behavior of the impact mechanism 40 as recognized by the recognition unit 84 is a particular type of behavior.

This configuration allows the user or any other person to determine, based on the output of the counter 86, whether or not the particular type of behavior of the impact mechanism 40 still persists.

In an impact tool 1 according to a nineteenth aspect, which may be implemented in conjunction with any one of the twelfth to eighteenth aspects, the acquisition unit 90 acquires the torque current acquisition value (current measured value iq1) and the excitation current acquisition value (current measured value id1). The recognition unit 84 recognizes, based on the torque current acquisition value and the excitation current acquisition value that have been acquired by the acquisition unit 90, the type of the behavior of the impact mechanism 40 that is performing the impact operation.

This configuration contributes to improving the recognition accuracy compared to a situation where the recognition unit 84 recognizes the type of the behavior of the impact mechanism 40 based on either only the torque current acquisition value (current measured value iq1) or only the excitation current acquisition value (current measured value id1).

In an impact tool 1 according to a twentieth aspect, which may be implemented in conjunction with any one of the first to nineteenth aspects, the acquisition unit 90 acquires an actually measured value (current measured value iq1) of the torque current as the torque current acquisition value.

This configuration enables making a decision about the type of behavior of the impact mechanism 40 based on an actual operation of the electric motor 3, compared to a situation where the target value (command value ciq1) of the torque current is used as the torque current acquisition value.

Note that the constituent elements according to all aspects but the first aspect are inessential to the impact tool 1 and may be omitted as appropriate.

REFERENCE SIGNS LIST

1 Impact Tool
3 Electric Motor
40 Impact Mechanism
42 Hammer
45 Anvil
7 Control Unit
79 Retreat Detection Unit (Detection Unit)
84 Recognition Unit
85 Output Unit
86 Counter
90 Acquisition Unit
312 Permanent Magnet
321 Coil
id1 Current Measured Value (Excitation Current Acquisition Value)
iq1 Current Measured Value (Torque Current Acquisition Value)

The invention claimed is:

1. An impact tool comprising:

an electric motor including a permanent magnet and a coil;

an impact mechanism configured to perform an impact operation that generates impacting force by receiving motive power from the electric motor;

an acquisition unit configured to acquire a value of a torque current to be supplied to the coil; and a behavior decision unit including a detection unit configured to detect, when finding an absolute value of a torque current acquisition value greater than a threshold value, occurrence of unstable behavior in the impact mechanism, the torque current acquisition value being the value of the torque current acquired by the acquisition unit.

2. The impact tool of claim 1, comprising a control unit configured to control operation of the electric motor.

3. The impact tool of claim 2, wherein the control unit is configured to, at least unless a result of detection obtained by the detection unit indicates occurrence of the unstable behavior in the impact mechanism, control the operation of the electric motor to bring a number of revolutions of the electric motor closer toward a certain target value.

4. The impact tool of claim 2, wherein the control unit is configured to, when the detection unit detects the occurrence of the unstable behavior in the impact mechanism, decrease a number of revolutions of the electric motor.

5. The impact tool of claim 1, wherein the impact mechanism includes: an anvil configured to hold a tip tool thereon; and a hammer configured to move relative to the anvil and apply rotational impact to the anvil by receiving the motive power from the electric motor, and the unstable behavior is a maximum retreat of the hammer to a position most distant from the anvil within a movable range of the hammer.

6. The impact tool of claim 1, wherein:

the behavior decision unit includes a recognition unit configured to recognize, based on at least one of the torque current acquisition value or an excitation current acquisition value, a type of behavior of the impact mechanism that is performing the impact operation, the excitation current acquisition value is the value of an excitation current to be supplied to the coil, and the excitation current generates, in the coil, a magnetic flux causing a variation in the permanent magnet's magnetic flux.

7. The impact tool of claim 6, wherein the impact mechanism is configured to generate the impacting force in every predetermined impact cycle while performing the impact operation, and the recognition unit is configured to recognize, based on at least one of the torque current acquisition value or the excitation current acquisition value between a beginning and an end of the impact cycle, the type of the behavior of the impact mechanism that is performing the impact operation.

8. The impact tool of claim 7, wherein the impact cycle is calculated based on a number of revolutions of the electric motor.

9. The impact tool of claim 6, further comprising an output unit configured to output a result of recognition obtained by the recognition unit.

10. The impact tool of claim 6, further comprising a control unit configured to control the operation of the electric motor based on a result of recognition obtained by the recognition unit.

11. The impact tool of claim 6, further comprising a counter configured to count a number of times that the impacting force has been generated.

12. The impact tool of claim 11, wherein the counter is configured to count the number of times that the impacting force has been generated in a state where the behavior of the impact mechanism as recognized by the recognition unit is a particular type of behavior.

13. The impact tool of claim 6, wherein the acquisition unit is configured to acquire the torque current acquisition value and the excitation current acquisition value, and the recognition unit is configured to recognize, based on the torque current acquisition value and the excitation current acquisition value that have been acquired by the acquisition unit, the type of the behavior of the impact mechanism that is performing the impact operation.

14. The impact tool of claim 1, wherein the acquisition unit is configured to acquire an actually measured value of the torque current as the torque current acquisition value.

* * * * *